US011952456B2

(12) United States Patent
Zarbakhsh et al.

(10) Patent No.: US 11,952,456 B2
(45) Date of Patent: Apr. 9, 2024

(54) PROCESS FOR PREPARING A POLYURETHANE USING A POLYESTER POLYOL COMPRISING POLYCYCLIC AROMATIC MOIETIES

(71) Applicant: BASF SE, Ludwigshafen am Rhein (DE)

(72) Inventors: Sirus Zarbakhsh, Ludwigshafen (DE); Nabarun Roy, Wyandotte, MI (US); Hendrik Wagner, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 232 days.

(21) Appl. No.: 16/495,514

(22) PCT Filed: Apr. 26, 2018

(86) PCT No.: PCT/EP2018/060778
§ 371 (c)(1),
(2) Date: Sep. 19, 2019

(87) PCT Pub. No.: WO2018/197632
PCT Pub. Date: Nov. 1, 2018

(65) Prior Publication Data
US 2020/0095368 A1   Mar. 26, 2020

(30) Foreign Application Priority Data

Apr. 26, 2017 (EP) .................................... 17168171
Aug. 16, 2017 (EP) .................................... 17186424

(51) Int. Cl.
*C08G 18/76* (2006.01)
*C08G 18/10* (2006.01)
*C08G 18/42* (2006.01)
*C08G 18/44* (2006.01)
*C08G 63/672* (2006.01)

(52) U.S. Cl.
CPC ......... *C08G 18/7664* (2013.01); *C08G 18/10* (2013.01); *C08G 18/4202* (2013.01); *C08G 18/4208* (2013.01); *C08G 18/4252* (2013.01); *C08G 18/44* (2013.01); *C08G 63/672* (2013.01)

(58) Field of Classification Search
CPC ............ C08G 18/7664; C08G 18/4202; C08G 18/4208; C08G 18/10; C08G 18/4252; C08G 18/44; C08G 63/672
See application file for complete search history.

(56) References Cited

U.S. PATENT DOCUMENTS

| 2,861,972 | A | * | 11/1958 | Muller ................. | C08G 18/664 |
| | | | | | 525/440.15 |
| 3,907,863 | A | | 9/1975 | Voss | |
| 4,385,133 | A | | 5/1983 | Alberino et al. | |
| 4,522,975 | A | | 6/1985 | O'Connor et al. | |
| 4,845,266 | A | | 7/1989 | Marx et al. | |
| 4,980,445 | A | | 12/1990 | Van Der Wal et al. | |
| 5,167,899 | A | | 12/1992 | Jezic | |
| 5,574,092 | A | | 11/1996 | Oriani et al. | |
| 2002/0143102 | A1 | | 10/2002 | Sasano et al. | |
| 2002/0156225 | A1 | * | 10/2002 | Onder ................ | C08G 18/6674 |
| | | | | | 528/44 |
| 2003/0139509 | A1 | * | 7/2003 | Onder ................. | C08G 18/664 |
| | | | | | 524/379 |
| 2006/0089453 | A1 | | 4/2006 | Pajerski | |
| 2008/0139774 | A1 | | 6/2008 | Lawrey et al. | |
| 2008/0269367 | A1 | * | 10/2008 | Neill ...................... | C08G 18/10 |
| | | | | | 521/137 |
| 2012/0202409 | A1 | * | 8/2012 | Shinchi .............. | C08G 18/4211 |
| | | | | | 451/526 |
| 2012/0214892 | A1 | | 8/2012 | Kunst et al. | |
| 2014/0350177 | A1 | | 11/2014 | Pajerski | |

FOREIGN PATENT DOCUMENTS

| AU | 2011335151 | 7/2015 |
| EP | 0 090 444 A2 | 10/1983 |
| EP | 0 379 149 A2 | 7/1990 |
| EP | 1 226 934 A1 | 7/2002 |
| EP | 1 932 863 A2 | 6/2008 |
| EP | 1 932 863 A3 | 6/2008 |

(Continued)

OTHER PUBLICATIONS

International Search Report dated Jul. 17, 2018 in PCT/EP2018/060778, citing documents AB, AO, AP and AQ therein, 4 pages.
Liaw, D.-J., "The relative physical and thermal properties of polyurethane elastomers", Die Angewandte Makromolekulare Chemie, 1997, pp. 89-104.
U.S. Appl. No. 15/576,967, filed Nov. 27, 2017, US 2018-0148624 A1, Kierat, R., et al.
U.S. Appl. No. 15/576,370, filed Nov. 22, 2017, US 2018-0155487 A1, Martinez, I.O., et al.
U.S. Appl. No. 16/478,701, filed Jul. 17, 2019, Roy, N., et al.

(Continued)

*Primary Examiner* — Rabon A Sergent

(74) *Attorney, Agent, or Firm* — Grüneberg and Myers PLLC

(57) ABSTRACT

The present invention is directed to a polyisocyanate polyaddition product, obtained or obtainable according to a process containing reacting at least a polyisocyanate composition (C-I) comprising at least one polyisocyanate; and a composition (C-II) comprising at least one compound (C-A) having at least two functional groups which are reactive towards isocyanate groups, wherein the compound (C-A) has a molecular weight of 500 g/mol or more and comprises polycyclic aromatic moieties. The present invention is further directed to a process for preparing said polyisocyanate polyaddition product and the use thereof in a cable, conveyor belt, roller, seal for gasket or railway pad.

14 Claims, No Drawings

(56) References Cited

FOREIGN PATENT DOCUMENTS

GB        1 452 073     10/1976
JP         5483670 B2    5/2014

OTHER PUBLICATIONS

U.S. Appl. No. 62/399,135, filed Sep. 23, 2016, Panchenko, A., et al.
U.S. Appl. No. 16/481,709, filed Jul. 29, 2019, Roy, N., et al.
U.S. Appl. No. 16/484,658, filed Aug. 8, 2019, Richter, S., et al.
U.S. Appl. No. 16/482,951, filed Aug. 1, 2019, Hollmann, R., et al.

\* cited by examiner

PROCESS FOR PREPARING A POLYURETHANE USING A POLYESTER POLYOL COMPRISING POLYCYCLIC AROMATIC MOIETIES

The presently claimed invention is directed to a oplyisocyanate polyaddition product, in particular a polyurethane, and a process for preparing a said polyisocyanate polyaddition product.

The versatility of polyurethanes is derived in large part from the wide selection of building blocks available to materials designers. The growth of polyurethanes has been highly dependent on the cheap and available feedstock-polyisocyanates, polyols and chain extender co-reactants such as water, alcohols, and amines. Of these, polyols are the largest volume raw material used in polyurethane applications. The polyols, as the name suggests, refer simply to polymer back-bones containing nominally two or more hydroxyl groups and provide softness and flexibility in urethane formulation. The isocyanates and low-molecular weight chain extenders provide hardness and stiffness to the resulting polymer structure.

Polyols are produced with a range of backbones and hydroxy functionalities that can be tailored to best meet application processing and property requirements. The structure of a polyol, to a greater extent, defines the properties of the resulting polyurethane as well as the compromises each structure demands of the final product performance. The most industrially significant polyol backbones are ether and ester based. When ester based polyols (also known as polyester polyol, polyesterol, polyester alcohol and PESOL) are used, it is usual to employ polycondensates of aromatic and/or aliphatic dicarboxylic acids and alkanediols and/or alkanetriols or ether diols.

AU 2011335151 discloses a polyester polyol comprising the esterification product of a dicarboxylic acid composition comprising an aromatic dicarboxylic acid or a mixture of aromatic dicarboxylic acids and one or more aliphatic dicarboxylic acids, one or more fatty acids and/or fatty acid derivatives, one or more aliphatic or cycloaliphatic diols and a polyether alcohol. The polyester polyols are then employed in a process for producing rigid polyurethane foams, to improve the flame resistance of the end product.

A rigid thermoplastic polyurethane having a $T_g$ of at least 50° C. and comprising sufficient concentration of units derived from an aromatic diol to lower the temperature at which the rigid thermoplastic polyurethane can be melt processed is disclosed in U.S. Pat. No. 5,574,092. The rigid thermoplastic polyurethane composition shows improved processability with insubstantial loss of physical properties.

Polyurethane elastomers synthesized based on polyols such as poly(caprolactonediol) and poly(tetramethylene glycol), diisocyanates such as diphenylmethane-4,4'-diisocyanate (MDI) and dicyclohexylmethane-4,4'-diisocyanate (HMDI) and two dihydroxynaphthalenes and their brominated derivatives used as chain extenders have been discussed by Der-Jang Liaw [Die Angewandte Makromolekular Chemie. 1997, 245, 89-104]. Introduction of bromine atoms in the dihydroxynaphthalenes increases the flame retardance and solubility of the polyurethanes while decreasing the mechanical and dynamic properties.

The existing polyester polyols do not provide satisfactory improvement in the mechanical performance of the polyurethanes. The polyurethanes obtained have unsatisfactory thermal resistance performance which limits them to low temperature applications. Moreover, the polyurethane having improved tensile strength, compression set value and creep performance along with a broad shore hardness range, as determined according to ASTM D2240 is a challenge to obtain using the existing polyester polyols.

Thus, it was an objective of the presently claimed invention to provide a polyester polyol which can be used in a process for producing a polyurethane, thereby providing a polyurethane having improved thermal resistance, tensile strength, compression set value and creep performance over a broad shore hardness range determined according to ASTM D2240 which is suitable for applications in automotive industry including cables for electric mobility, in hybrid cars as well as in manufacturing industry for conveyor belts, rollers, seals for gaskets and in railway pads.

According to the present invention, this object is achieved by a polyisocyanate polyaddition product, obtained or obtainable according to a process comprising reacting at least the following components:

(i) a polyisocyanate composition (C-I) comprising at least one polyisocyanate; and
(ii) a composition (C-II) comprising at least one compound (C-A) having at least two functional groups which are reactive towards isocyanate groups, wherein the compound (C-A) has a molecular weight of 500 g/mol or more and comprises polycyclic aromatic moieties.

Surprisingly, it has been found that a polyester polyol based polyisocyanate polyaddition product, in particular a polyurethane, having incorporated in the polyester polyol at least one alkoxylated naphthalene diol in the range of ≥10 wt.-% to ≤40 wt.-% based on the total weight of the polyester polyol, provides a polyurethane with improved thermal resistance, tensile strength, compression set value and creep performance over a broad shore hardness ranging from a Shore A hardness of 70 to a Shore D hardness of 80 determined according to ASTM D2240, thereby rendering the polyurethane with superior properties which enable them to be employed over a wide range of application such as, but not limited to, automotive industry in cables for electric mobility, in hybrid cars as well as in manufacturing industry for conveyor belts, rollers, seals for gaskets and in railway pads.

According to the present invention, a polyisocyanate polyaddition product is obtained or obtainable according to a process comprising reacting at least a polyisocyanate composition (C-I) comprising at least one polyisocyanate; and a composition (C-II) comprising at least one compound (C-A) having at least two functional groups which are reactive towards isocyanate groups, wherein the compound (C-A) has a molecular weight of 500 g/mol or more and comprises polycyclic aromatic moieties.

The composition (C-II) comprises at least one compound (C-A). According to the present invention, the compound (C-A) comprises polycyclic aromatic moieties, preferably $C_{10}$ to $C_{14}$ aromatic moieties. The polycyclic aromatic moieties according to the present invention might for example comprise fused aromatic rings, for example fused aromatic rings with 10 to 14 carbon atoms.

According to a further embodiment, the present invention is also directed to the polyisocyanate polyaddition product as disclosed above, wherein the polycyclic aromatic moieties of the compound (C-A) comprise fused aromatic rings.

Compound (C-A) might be any suitable compound with at least two functional groups which are reactive towards isocyanate groups, such as amino or hydroxyl-groups. The compound (C-A) might preferably be a polyol or polyamine, preferably a diol or a diamine.

According to a further embodiment, the present invention is also directed to the polyisocyanate polyaddition product as disclosed above, wherein the compound (C-A) is a polyol.

According to a further embodiment, the present invention is also directed to the polyisocyanate polyaddition product as disclosed above, wherein the compound (C-A) is a polyol selected from the group consisting of polyesters, polyethers and polycarbonates.

The composition (C-II) which might also be referred to as polyol composition in the context of the present invention comprises at least compound (C-A). According to the present invention, the composition (C-II) might also comprise further polyols. Suitable polyols are for example polyols having a functionality of from 2 to 4 and molecular weights of from 500 g/mol to 8000 g/mol. Preferably, the molecular weight is in the range of from 500 g/mol to 6000 g/mol.

Furthermore, depending on the nature of the polyurethane prepared, the polyol composition may comprise low molecular weight chain extenders and crosslinkers and also further auxiliaries and additives.

Suitable crosslinkers are known to the person skilled in the art.

In the context of the present invention, compound (C-A) preferably is a polyol selected from the group consisting of polyesters, polyethers and polycarbonates. According to the present invention, the polycyclic aromatic moieties preferably are incorporated in the compound (C-A) via ester or ether-linkage. It is for example possible to include the polycyclic aromatic moieties in compound (C-A) via esterification of a suitable diol with a suitable dicarboxylic acid.

Polyester polyols are low molecular weight polymers characterized by the presence of ester groups and terminal hydroxyl groups. The polyester polyols are majorly obtained by the polycondensation reactions between dicarboxylic acids (or derivatives such as esters or anhydrides) and polyols. Accordingly, the present invention polyester polyol comprises:

(A) ≥10 wt.-% to ≤70 wt.-% of at least one $C_4$ to $C_{12}$ aliphatic dicarboxylic acid, (B) ≥10 wt.-% to ≤70 wt.-% of at least one $C_2$ to $C_{10}$ diol, and (C) ≥10 wt.-% to ≤70 wt.-% of at least one alkoxylated $C_{10}$ to $C_{14}$ aromatic diol, wherein wt.-% is based on the total weight of the polyester polyol and the sum of wt.-% of the components (A), (B) and (C) adds up to 100% wt.-%.

Preferably in the polyester polyol, as described hereinabove, the at least one $C_4$ to $C_{12}$ aliphatic dicarboxylic acid is selected from the group consisting of glutaric acid, adipic acid, pimelic acid, suberic acid, azelaic acid, sebacic acid, undecanedioic acid and dodecanedioic acid. More preferably, the at least one $C_4$ to $C_{12}$ aliphatic dicarboxylic acid is at least one $C_5$ to $C_{10}$ aliphatic dicarboxylic acid selected from the group consisting of glutaric acid, adipic acid, azelaic acid and sebacic acid. Most preferably, the at least one $C_4$ to $C_{12}$ aliphatic dicarboxylic acid is at least one $C_5$ to $C_9$ aliphatic dicarboxylic acid selected from the group consisting of glutaric acid, adipic acid, azelaic acid. The choice of at least one $C_4$ to $C_{12}$ aliphatic dicarboxylic acids for the polyester polyol, as described hereinabove, is not limited to the method used to prepare the same. In this regard, a person skilled in the art is well aware of such methods and may employ any of the available techniques to obtain the aliphatic dicarboxylic acids. In an embodiment, the at least one $C_4$ to $C_{12}$ aliphatic dicarboxylic acid is an adipic acid.

The at least one $C_4$ to $C_{12}$ aliphatic dicarboxylic acid is present in the polyester polyol, as described hereinabove, preferably in an amount ≥10 wt.-% to ≤70 wt.-% based on the total weight of the polyester polyol. More preferably, the at least one $C_4$ to $C_{12}$ aliphatic dicarboxylic is present in an amount ≥15 wt.-% to ≤70 wt.-%, even more preferably in an amount ≥15 wt.-% to ≤65 wt.-% or ≥20 wt.-% to ≤65 wt.-% or ≥20 wt.-% to ≤60 wt.-% or ≥25 wt.-% to ≤60 wt.-% or ≥30 wt.-% to ≤60 wt.-% or ≥35 wt.-% to ≤60 wt.-% based on the total weight of the polyester polyol. Most preferably, the at least one $C_4$ to $C_{12}$ aliphatic dicarboxylic acid is present in an amount ≥40 wt.-% to ≤60 wt.-%, even most preferably in an amount ≥40 wt.-% to ≤55 wt.-% based on the total weight of the polyester polyol. In an embodiment, the at least one $C_4$ to $C_{12}$ aliphatic dicarboxylic acid is present in an amount ≥40 wt.-% to ≤50 wt.-% based on the total weight of the polyester polyol.

Preferably, the at least one $C_2$ to $C_{10}$ diol in the polyester polyol is selected from the group consisting of ethylene glycol, 1,3-propanediol, 1,4-butanediol, 2-methyl-1,3-propanediol, 1,5-pentanediol, 2,4-pentanediol, 2-methyl-2,4-pentanediol, 3-methyl-1,5-pentanediol, 1,6-hexanediol and a mixture thereof. More preferably, the at least one $C_2$ to $C_{10}$ diol is at least one $C_3$ to $C_9$ diol selected from the group consisting of 1,3-propanediol, 1,4-butanediol, 1,5-pentanediol, 2,4-pentanediol, 3-methyl-1,5-pentanediol, 1,6-hexanediol and a mixture thereof. Most preferably, the at least one $C_2$ to $C_{10}$ diol is at least one $C_3$ to $C_8$ diol selected from the group consisting of 1,3-propanediol, 1,4-butanediol, 1,5-pentanediol, 1,6-hexanediol and a mixture thereof. In an embodiment, the at least one $O_2$ to $C_{10}$ diol is selected from the group consisting of 1,4-butanediol, 1,5-pentanediol, 1,6-hexanediol and a mixture thereof.

The at least one $C_2$ to $C_{10}$ diol in the polyester polyol is present in an amount ≥10 wt.-% to ≤70 wt.-% based on the total weight of the polyester polyol. More preferably, the at least one $C_2$ to $C_{10}$ diol is present in an amount ≥10 wt.-% to ≤65 wt.-%, even more preferably in an amount ≥10 wt.-% to ≤60 wt.-% or ≥10 wt.-% to ≤55 wt.-% or ≥10 wt.-% to ≤50 wt.-% based on the total weight of the polyester polyol. Most preferably, the at least one $C_2$ to $C_{10}$ diol is present in an amount ≥10 wt.-% to ≤45 wt.-%, even most preferably in an amount ≥10 wt.-% to ≤40 wt.-% or ≥10 wt.-% to ≤35 wt.-% or ≥15 wt.-% to ≤35 wt.-% or ≥15 wt.-% to ≤30 wt.-% based on the total weight of the polyester polyol. The choice of at least one $C_2$ to $C_{10}$ diol for the polyester polyol, as described hereinabove, is not limited to any particular method for preparing the same. Accordingly, the person skilled in the art may obtain above described diols by any suitable method. The at least one $C_2$ to $C_{10}$ diol, in an embodiment, is in particular present in an amount ≥20 wt.-% to ≤30 wt.-% based on the total weight of the polyester polyol.

The polyester polyol, as described hereinabove, also comprises of at least one alkoxylated $C_{10}$ to $C_{14}$ aromatic diol. By the term "alkoxylated", it is referred to the end capping of $C_{10}$ to $C_{14}$ aromatic diol by suitable alkylene oxides in an alkoxylation reaction. Accordingly, in an embodiment the at least one alkoxylated $C_{10}$ to $C_{14}$ aromatic diol is an alkoxylation reaction product of at least one $C_{10}$ to $C_{14}$ aromatic diol with at least one $C_2$ to $C_4$ alkylene oxide. Preferably, the at least one $C_2$ to $C_4$ alkylene oxide is selected from the group consisting of ethylene oxide, propylene oxide and butylene oxide. In an embodiment, the at least one alkoxylated $C_{10}$ to $C_{14}$ aromatic diol is an ethoxylated and/or propoxylated $C_{10}$ to $C_{14}$ aromatic diol i.e. the at least one $C_{10}$ to $C_{14}$ aromatic diol is end capped with ethylene oxide or propylene oxide or a mixture of ethylene oxide and propylene oxide.

The at least one $C_{10}$ to $C_{14}$ aromatic diol in the at least one alkoxylated $C_{10}$ to $C_{14}$ aromatic diol of the polyester polyol, as described hereinabove, is preferably a $C_{10}$ aromatic diol. The $C_{10}$ aromatic diol, also known as naphthalene diol, shall be hereinafter interchangeably referred to as dihydroxynaphthalene. The dihydroxynaphthalene is an organic compound with the formula $C_{10}H_6(OH)_2$. The incorporation of a naphthalene motif such as the dihydroxynaphthalene in the in the polyester polyol of the present invention provides for the improved mechanical performance by providing additional π-π stacking to the product polyurethane.

The dihydroxynaphthalene exists in several isomers. Several of these isomers have been found suitable for the purpose of the present invention. Accordingly, the naphthalene diol or dihydroxynaphthalene of the at least one $C_{10}$ to $C_{14}$ aromatic diol in the at least one alkoxylated $C_{10}$ to $C_{14}$ aromatic diol of the polyester polyol is selected from the group consisting of 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene and 2,7-dihydroxynaphthalene.

Preferably, the dihydroxynaphthalene is selected from the group consisting of 1,4-dihydroxynaphthalene, 1,5-dihydroxynaphthalene, 1,6-dihydroxynaphthalene, 1,7-dihydroxynaphthalene and 1,8-dihydroxynaphthalene.

More preferably, the dihydroxynaphthalene is selected from the group consisting of 1,4-dihydroxynaphthalene, 1,5-dihydroxynaphthalene, 1,6-dihydroxynaphthalene and 1,8-dihydroxynaphthalene.

In an embodiment, the dihydroxynaphthalene of the at least one $C_{10}$ to $C_{14}$ aromatic diol in the at least one alkoxylated $C_{10}$ to $C_{14}$ aromatic diol of the polyester polyol is selected from the group consisting of 1,4-dihydroxynaphthalene, 1,5-dihydroxynaphthalene and 1,8-dihydroxynaphthalene.

In the at least one alkoxylated $C_{10}$ to $C_{14}$ aromatic diol of the polyester polyol, the molar ratio of the at least one $C_2$ to $C_4$ alkylene oxide to the at least one $C_{10}$ to $C_{14}$ aromatic diol is preferably in the range of $\geq 1.5:1$ to $\leq 20:1$. More preferably, the ratio is in the range of $\geq 2:1$ to $\leq 20:1$, even more preferably in the range of $\geq 2.5:1$ to $\leq 18:1$, most preferably in the range of $\geq 2:1$ to $\leq 18:1$. In particular the ratio is in the range of $\geq 3:1$ to $\leq 18:1$. Most preferably, the ratio is in the range of $\geq 3.5:1$ to $\leq 18:1$, or in the range of $\geq 4.5:1$ to $\leq 18:1$, or in the range of $\geq 4:1$ to $\leq 18:1$. In particular, the ratio is in the range of $\geq 5:1$ to $\leq 16:1$. Even more particularly preferably, the ratio is in the range of $\geq 6:1$ to $\leq 16:1$, most particularly the ratio is in the range of $\geq 6.5:1$ to $\leq 16:1$. In an embodiment, the molar ratio of the at least one $C_2$ to $C_4$ alkylene oxide to the at least one $C_{10}$ to $C_{14}$ aromatic diol in the at least one alkoxylated $C_{10}$ to $C_{14}$ aromatic diol of the polyester polyol is in the range of $\geq 7:1$ to $\leq 16:1$.

The alkoxylation reaction between the at least one $C_{10}$ to $C_{14}$ aromatic diol with the at least one $C_2$ to $C_4$ alkylene oxide is not limited to a particular process condition of temperature, pressure, residence time, etc. In fact, process conditions of any suitable alkoxylation reaction may be adopted to obtain the at least one alkoxylated $C_{10}$ to $C_{14}$ aromatic diol, as described hereinabove. Such process conditions of alkoxylation reaction are well known to a person skilled in the art.

Preferably, the reaction between the at least one $C_{10}$ to $C_{14}$ aromatic diol with the at least one $C_2$ to $C_4$ alkylene oxide is carried out in the presence of at least one catalyst. Preferably the at least one catalyst is a base or a double metal cyanide catalyst (DMC catalyst). More preferably the at least one catalyst is selected from the group consisting of alkaline earth metal hydroxides such as calcium hydroxide, strontium hydroxide and barium hydroxide, alkali metal hydroxides such as lithium hydroxide, sodium hydroxide, potassium hydroxide, rubidium hydroxide and caesium hydroxide and alkali metal alkoxylates such as potassium tert-butoxylate. Most preferably the at least one catalyst is potassium hydroxide or caesium hydroxide.

In case the catalyst is a base, any inert solvents capable of dissolving alkoxylated $C_{10}$ to $C_{14}$ aromatic diols may be used as solvents during the reaction or as solvents required for working up the reaction mixture in cases where the reaction is carried out without solvents. The following solvents are mentioned as examples: toluene, methylene chloride, trichloroethylene, tetrahydrofuran, dioxane, methyl ethyl ketone, methylisobutyl ketone, ethyl acetate and isobutyl acetate.

In case the catalyst is a base, the amount of catalysts used is preferably in the range from 0.01 to 3.0, more preferably in the range from 0.05 to 2.0, % by weight, based on the total amount of the alkoxylated $C_{10}$ to $C_{14}$ aromatic diol. The reaction is preferably carried out at a temperature in the range of 70 to 200° C., more preferably from 100 to 160° C. The pressure is preferably in the range from 1 bar to 50 bar, more preferably in the range from 1 bar to 40 bar, even more preferably in the range from 1 bar to 30 bar or 2 bar to 30 bar. Particularly, the pressure is in the range from 3 bar to 30 bar.

The alkoxylated $C_{10}$ to $C_{14}$ aromatic diol may also be obtained from DMC catalysts. The DMC catalysts are usually prepared as a solid and used as such. The catalyst is typically used as powder or in suspension. However, other ways known to those skilled in the art for using catalysts can likewise be employed. The DMC catalyst can be dispersed with an inert or non-inert suspension medium which can be, for example, the product to be produced or an intermediate by suitable measures, e.g. milling. The suspension produced in this way is used, if appropriate after removal of interfering amounts of water by methods known to those skilled in the art, e.g. stripping with or without use of inert gases such as nitrogen and/or noble gases. Suitable suspension media are, for example, toluene, xylene, tetrahydrofuran, acetone, 2-methylpentanone, cyclohexanone and also polyether alcohols and mixtures thereof. The catalyst is preferably used in a suspension in the polyester polyol as described, for example, in EP 0 090 444 A.

Preferably, the at least one alkoxylated $C_{10}$ to $C_{14}$ aromatic diol has a weight average molecular weight Mw in the range of 200 to 1000 g/mol determined according to DIN 55672-1. More preferably, the weight average molecular weight Mw is in the range of 250 to 1000 g/mol, even more preferably in the range of 250 to 900 g/mol determined according to DIN 55672-1. Most preferably, the weight average molecular weight Mw is in the range of 300 to 900 g/mol, even most preferably in the range of 300 to 800 g/mol, particularly in the range of 300 to 700 g/mol determined according to DIN 55672-1. In a particular preferred embodiment, the at least one alkoxylated $C_{10}$ to $C_{14}$ aromatic diol has a weight average molecular weight Mw in the range of 300 to 600 g/mol determined according to DIN 55672-1.

The viscosity of the at least one alkoxylated $C_{10}$ to $C_{14}$ aromatic diol is in the range of ≥500 mPa·s to ≤2500 mPa·s determined according to DIN EN ISO 3219 at 25° C. More preferably, the viscosity is in the range of ≥600 mPa·s to ≤2500 mPa·s determined according to DIN EN ISO 3219 at 25° C. Most preferably, the viscosity is in the range of ≥600 mPa·s to ≤2400 mPa·s determined according to DIN EN ISO 3219 at 25° C. In an embodiment, the viscosity of the at least one alkoxylated $C_{10}$ to $C_{14}$ aromatic diol is in the range of ≥650 mPa·s to ≤2400 mPa·s determined according to DIN EN ISO 3219 at 25° C.

The at least one alkoxylated $C_{10}$ to $C_{14}$ aromatic diol has an OH value preferably in the range of ≥120 mg KOH/g to ≤260 mg KOH/g determined according to DIN 53240. More preferably, the OH value is in the range of ≥120 mg KOH/g to ≤250 mg KOH/g determined according to DIN 53240. Most preferably, the OH value is in the range of ≥130 mg KOH/g to ≤250 mg KOH/g determined according to DIN 53240. In an embodiment, the at least one alkoxylated $C_{10}$ to $C_{14}$ aromatic diol has an OH value preferably in the range of ≥140 mg KOH/g to ≤250 mg KOH/g determined according to DIN 53240.

The at least one alkoxylated $C_{10}$ to $C_{14}$ aromatic diol in the polyester polyol is preferably in an amount ≥10 wt.-% to ≤70 wt.-% based on the total weight of the polyester polyol. More preferably, the at least one alkoxylated $C_{10}$ to $C_{14}$ is in an amount ≥10 wt.-% to ≤65 wt.-%, even more preferably in an amount ≥10 wt.-% to ≤60 wt.-% or ≥10 wt.-% to ≤55 wt.-% or ≥10 wt.-% to ≤50 wt.-% based on the total weight of the polyester polyol. Most preferably, the at least one alkoxylated $C_{10}$ to $C_{14}$ in the polyester polyol is preferably in an amount ≥15 wt.-% to ≤50 wt.-%, even most preferably in an amount ≥15 wt.-% to ≤45 wt.-% or ≥15 wt.-% to ≤40 wt.-% or ≥15 wt.-% to ≤35 wt.-% or ≥15 wt.-% to ≤30 wt.-% based on the total weight of the polyester polyol. In a particularly preferred embodiment, the at least one alkoxylated $C_{10}$ to $C_{14}$ in the polyester polyol is preferably in an amount ≥20 wt.-% to ≤30 wt.-% based on the total weight of the polyester polyol.

Any suitable technique may be adopted for preparing the polyester polyol. For instance, the at least one $C_4$ to $C_{12}$ aliphatic dicarboxylic acid, at least one $C_2$ to $C_{10}$ diol and at least one alkoxylated $C_{10}$ to $C_{14}$ aromatic diol, as described hereinabove, may be polycondensated in the absence of catalysts or preferably in the presence of esterification catalysts, advantageously in an atmosphere of inert gas, e.g. nitrogen, carbon monoxide, helium, argon, etc. in the melt at temperature ranging between 150° C. to 300° C., optionally under reduced pressure, to the desired acid number which is advantageously less than 10, preferably less than 2. Possible esterification catalysts that may be suitably employed are, but not limited to, iron, cadmium, cobalt, lead, zinc, antimony, magnesium, titanium and tin catalysts in the form of metals, metal oxides or metal salts. Alternatively, the polyester polyol of the present invention may be prepared according to one or more of the processes as disclosed in U.S. Pat. Nos. 3,907,863, 4,845,266 or US 2012/0214892 by making the necessary substitution as and where required as per the present invention.

The polyester polyol, as disclosed hereinabove, has an OH value preferably in the range of ≥30 mg KOH/g to ≤150 mg KOH/g determined according to DIN 53240. More preferably, the OH value is in the range of ≥30 mg KOH/g to ≤120 mg KOH/g, even more preferably in the range of ≥30 mg KOH/g to ≤100 mg KOH/g determined according to DIN 53240. Most preferably, the OH value is in the range of ≥30 mg KOH/g to ≤80 mg KOH/g determined according to DIN 53240. In a particular preferred embodiment, the polyester polyol has an OH value preferably in the range of ≥35 mg KOH/g to ≤60 mg KOH/g determined according to DIN 53240.

The weight average molecular weight of the polyester polyol, as disclosed hereinabove, is in the range of 1000 to 4000 g/mol determined according to DIN 55672-1. Preferably, the weight average molecular weight of the polyester polyol is in the range of 1000 to 3800 g/mol determined according to DIN 55672-1. More preferably, the weight average molecular weight of the polyester polyol is in the range of 1200 to 3800 g/mol determined according to DIN 55672-1. Most preferably, the weight average molecular weight of the polyester polyol is in the range of 1200 to 3500 g/mol, particularly in the range of 1500 to 3500 g/mol determined according to DIN 55672-1. In a particularly preferred embodiment, the weight average molecular weight of the polyester polyol is in the range of 1800 to 3500 g/mol determined according to DIN 55672-1. Preferably, the viscosity of the polyester polyol of the present invention is in the range of ≥500 mPa·s to ≤2000 mPa·s determined according to DIN EN ISO 3219 at 25° C. More preferably, the viscosity is in the range of ≥500 mPa·s to ≤1800 mPa·s determined according to DIN EN ISO 3219 at 25° C. Most preferably, the viscosity is in the range of ≥600 mPa·s to ≤1800 mPa·s determined according to DIN EN ISO 3219 at 25° C. In a particularly preferred embodiment, the viscosity of the polyester polyol of the present invention is in the range of ≥600 mPa·s to ≤1500 mPa·s determined according to DIN EN ISO 3219 at 25° C.

Accordingly, in an embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated dihydroxynaphthalene,
wherein wt.-% is based on the total weight of the polyester polyol and the sum of wt.-% of the components (A), (B) and (C) adds up to 100% wt.-%.

In another embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated 1,2-dihydroxynaphthalene,
wherein wt.-% is based on the total weight of the polyester polyol and the sum of wt.-% of the components (A), (B) and (C) adds up to 100% wt.-%.

In another embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated 1,3-dihydroxynaphthalene,
wherein wt.-% is based on the total weight of the polyester polyol and the sum of wt.-% of the components (A), (B) and (C) adds up to 100% wt.-%.

In another embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated 1,4-dihydroxynaphthalene, wherein wt.-% is based on the total weight of the polyester polyol and the sum of wt.-% of the components (A), (B) and (C) adds up to 100% wt.-%.

In another embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated 1,5-dihydroxynaphthalene,
wherein wt.-% is based on the total weight of the polyester polyol and the sum of wt.-% of the components (A), (B) and (C) adds up to 100% wt.-%.

In another embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated 1,6-dihydroxynaphthalene,
wherein wt.-% is based on the total weight of the polyester polyol and the sum of wt.-% of the components (A), (B) and (C) adds up to 100% wt.-%.

In another embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated 1,7-dihydroxynaphthalene,
wherein wt.-% is based on the total weight of the polyester polyol and the sum of wt.-% of the components (A), (B) and (C) adds up to 100% wt.-%.

In another embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated 1,8-dihydroxynaphthalene,
wherein wt.-% is based on the total weight of the polyester polyol and the sum of wt.-% of the components (A), (B) and (C) adds up to 100% wt.-%.

In another embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated 2,3-dihydroxynaphthalene,
wherein wt.-% is based on the total weight of the polyester polyol and the sum of wt.-% of the components (A), (B) and (C) adds up to 100% wt.-%.

In another embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated 2,6-dihydroxynaphthalene,
wherein wt.-% is based on the total weight of the polyester polyol and the sum of wt.-% of the components (A), (B) and (C) adds up to 100% wt.-%.

In another embodiment, the polyester polyol, as described hereinabove comprises:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated 2,7-dihydroxynaphthalene,
wherein wt.-% is based on the total weight of the polyester polyol and the sum of wt.-% of the components (A), (B) and (C) adds up to 100% wt.-%.

According to the present invention, the polyisocyanate polyaddition product may be any polyaddition product of a polyisocyanate, depending on the functional groups of the compound (C-A). Preferably, the polyisocyanate polyaddition product is a polyurethane according to the present invention, more preferable a polyurethane based on a polyesterdiol.

In the preparation of the polyisocyanate polyaddition product, a composition (C-I) is used, comprising at least one polyisocyanate.

Suitable polyisocyanates, preferably diisocyanates, are known. As polyisocyanates it is possible to use aliphatic, cycloaliphatic, araliphatic and/or aromatic diisocyanates. Specific examples include the following aromatic isocyanates: 2,4-tolylene diisocyanate, mixtures of 2,4- and 2,6-toluene diisocyanate, 4,4'-, 2,4'- and/or 2,2'-diphenylmethane diisocyanate (MDI), mixtures of 2,4'- and 4,4'-diphenylmethane diisocyanate, urethane-modified liquid 4,4'- and/or 2,4-diphenylmethane diisocyanates, 4,4'-diisocyanatodiphenylethane, the mixtures of monomeric methanediphenyl diisocyanates and more highly polycyclic homologues of methanediphenyl diisocyanate (polymeric MDI), 1,2- and 1,5-naphthylene diisocyanate.

Aliphatic diisocyanates used are customarily aliphatic and/or cycloaliphatic diisocyanates, examples being tri-, tetra-, penta-, hexa-, hepta- and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4-and/or -2,6-cyclohexane diisocyanate, 4,4'-, 2,4'- and/or 2,2'-dicyclohexylmethane diisocyanate.

Polyisocyanate prepolymers are obtainable by reacting above-described polyisocyanates in excess, at temperatures of 30 to 100° C., for example, preferably at about 80° C., with polyols to give the prepolymer. For the preparation of the prepolymers of the invention, preference is given to using polyisocyanates and commercial polyols based on polyesters, starting for example from adipic acid, or on polyethers, starting for example from ethylene oxide and/or propylene oxide.

Polyols are known to the skilled person and are described for example in "Kunststoffhandbuch, volume 7, Polyurethane", Carl Hanser Verlag, 3rd edition 1993, section 3.1. Polyols used with preference in this context are the polymeric compounds described under b), having hydrogen atoms that are reactive toward isocyanates. Particularly preferred for use as polyols are polyetherols.

In the preparation of the isocyanate prepolymers, customary chain extenders or crosslinking agents are added optionally to the stated polyols. Such substances are described above hereinafter. Particularly preferred for use as chain extender is 1,4-butanediol, dipropylene glycol and/or tripropylene glycol. In this case the ratio of organic polyisocyanates to polyols and chain extenders is preferably selected such that the isocyanate prepolymer has an NCO content of 2% to 30%, preferably of 6% to 28%, more preferably of 10% to 24%.

According to a further embodiment, the present invention is also directed to the polyisocyanate polyaddition product as disclosed above, wherein the polyisocyanate is an aromatic polyisocyanate.

According to the present invention, composition (C-I) and/or composition (C-II) might comprise further compounds, such as for example chain extenders. According to the present invention it is possible to react composition (C-I) and (C-II) in a first step to give a prepolymer which in turn is then reacted with a further polyol or chain extender. However, it is also possible that composition (C-I) and (C-II) are reacted in a one-step process to result in the polyisocyanate polyaddition product. In case the composition (C-I) and (C-II) are reacted in a one-step process, composition (C-II) preferably comprises further polyols and/or chain extenders.

According to a further embodiment, the present invention thus is also directed to the process as disclosed above, wherein a compound (C—C) having at least two functional groups which are reactive towards isocyante groups is used in the process as chain extender, wherein the compound (C—C) has a molecular weight in the range of from 49 g/mol to 499 g/mol.

In another aspect of the present invention a process for preparing a polyisocyanate polyaddition product, in particular a polyurethane is disclosed.

According to a further aspect, the present invention is therefore directed process for preparing a polyisocyanate polyaddition product comprising reacting at least the following components:
(i) a polyisocyanate composition (C-I) comprising at least one polyisocyanate; and
(ii) a composition (C-II) comprising at least one compound (C-A) having at least two functional groups which are reactive towards isocyanate groups, wherein the compound (C-A) has a molecular weight of 500 g/mol or more and comprises polycyclic aromatic moieties.

The process of the present invention preferably is a one-shot process for preparing a polyurethane. By the term "one-shot process" it is meant that the polyurethane formation takes place by simultaneous reaction of polyol, isocyanate and chain extender. Alternatively, prepolymer process may also be employed, however, such processes generally require at least one step of reacting a polyol and isocyanate to obtain a prepolymer followed by reacting the said prepolymer with a chain extender to obtain a polyurethane. Accordingly, the prepolymer processes are complex in nature as they require stringent process conditions and additional steps, thereby making the overall process uneconomical. On the other hand, the one-shot process provides an efficient reliable and economical method for obtaining a polyurethane.

The polyurethane obtained by the one-shot process of the present invention is a segmented polyurethane. The segmented polyurethanes are formed from the reaction of three basic polyurethane constituents viz. at least one isocyanate, at least one polyester polyol and at least one low molecular weight polyfunctional compound reactive towards isocyanate. They are regarded as possessing an alternating, $(AB)_n$ type block copolymeric structure, where A represents a soft segment and B represents a hard segment. For the purpose of the present invention, the soft segment is comprised of a polyester polyol, as discussed hereinabove, while the hard segment is derived from the isocyanate structures linked by the at least one low molecular weight polyfunctional compound reactive towards isocyanate. The soft segment imparts amorphous properties to the polyurethane, while the hard segment imparts partially crystalline nature to the polyurethane. The soft segments primarily influence the elastic nature and low temperature performance while the hard segments particularly affect the modulus, hardness and upper-use temperature by their ability to remain associated. Thus, to obtain a polyurethane having the desired mechanical performance characteristics of thermal resistance, tensile strength, compression set value and creep performance over a broad shore hardness range, the soft and hard segment fractions need to be adjusted accordingly.

Accordingly, a process for preparing a polyurethane, comprises the steps of:
(a) providing a polyester polyol, as described above,
(b) providing at least one isocyanate and at least one low molecular weight polyfunctional compound reactive towards isocyanate,
(c) reacting the polyester polyol of step (a) with the step (b) optionally in the presence of at least one catalyst and/or with at least one additive to obtain a polyurethane having a hard segment fraction in the range of ≥0.10 to ≤0.90 and a $T_g$ in the range of ≥−30° C. to ≤80° C. determined by differential scanning calorimetry according to DIN EN ISO 11357-1 at a heating rate of 20 K/min, the hard segment fraction being defined by the formula:

$$\text{Hard segment fraction} = \left\{ \sum_{x=1}^{k} [(m_{KV,CI} / M_{KV,CI}) * M_{Iso} + m_{KV,CI}] \right\} / m_{total}$$

wherein,
$M_{KV,CI}$ is the mass of the low molecular weight polyfunctional compound reactive towards isocyanate in g,
$M_{KV,CI}$ is the molar mass of the low molecular weight polyfunctional compound reactive towards isocyanate in g/mol,
$M_{Iso}$ is the molar mass of the isocyanate in g/mol,
$m_{total}$ is the total mass of all the starting materials in g,
k is the number of low molecular weight polyfunctional compound reactive towards isocyanate, and
wherein the low molecular weight polyfunctional compound reactive towards isocyanate has a weight average molecular weight in the range of 15 to 300 g/mol determined according to DIN 55672-1.

The polyester polyol provided in step (a) of the process has already been described hereinabove. To this polyester polyol, at least one secondary polyol may be added. The at least one secondary polyol is selected from the group consisting of a polyester polyol, polyether polyol or a mixture thereof and are commercially available in the market such as, but not limited to, Lupraphen® by BASF. The polyester polyol together with the at least one secondary polyol constitutes the soft segment of the polyurethane. However, when the secondary polyol is selected as a polyester polyol, the polyester polyol is chosen different than the one already described hereinabove. This means that the secondary polyol may be any other available polyester polyol except the polyester polyol comprising:
(A) ≥10 wt.-% to ≤70 wt.-% of adipic acid,
(B) ≥10 wt.-% to ≤70 wt.-% of at least one $C_3$ to $C_8$ diol, and
(C) ≥10 wt.-% to ≤70 wt.-% of at least one alkoxylated dihydroxynaphthalene, wherein wt.-% is based on the total weight of the polyester polyol and the sum of wt.-% of the components (A), (B) and (C) adds up to 100% wt.-%.

Preferably, the ratio of the polyester polyol to the at least one secondary polyol is in the range of ≥5:95 to ≤70:30 by weight. More preferably, the ratio is in the range of ≥5:95 to ≤75:25 by weight. Most preferably, the ratio is in the range of ≥8:92 to ≤75:25 by weight. In a particularly preferred embodiment, the ratio of the polyester polyol to the at least one secondary polyol in step (a) of the above process is in the range of ≥8:92 to ≤77:23 by weight.

The at least one isocyanate which might react in step (b) of the above process preferably is a diisocyanate. Preferred diisocyanate include aromatic, aliphatic and cycloaliphatic diisocyanates and combinations thereof. Representative examples of these preferred diisocyanates may be found, for example, from U.S. Pat. Nos. 4,385,133, 4,522,975 and 5,167,899, all incorporated herein by reference and may be selected from the group consisting of diphenylmethane 4,4'-diisocyanate, tolylene 2,6-diisocyanate, dicyclohexylmethane 2,2'-diisocyanate, hexamethylene 1,6-diisocyanate, paraphenylene 2,4-diisocyanate, tetramethylenexylene 2,4-diisocyanate, 2 methylpentamethylene 1,5 diisocyanate, 2 ethylbutylene 1,4 diisocyanate, pentamethylene 1,5 diisocyanate, butylene 1,4 diisocyanate and 1 isocyanato-3,3,5 trimethyl-5 isocyanatomethylcy-clohexane.

More preferably, the diisocyanate is selected from the group consisting of diphenylmethane 4,4'-diisocyanate, tolylene 2,6-diisocyanate, dicyclohexylmethane 2,2'-diisocyanate, hexamethylene 1,6-diisocyanate, tetramethylenexylene 2,4-diisocyanate and 1 isocyanato-3,3,5 trimethyl-5 isocyanatomethylcyclohexane.

Most preferably, the diisocyanate is selected from the group consisting of diphenylmethane 4,4'-diisocyanate, tolylene 2,6-diisocyanate, dicyclohexylmethane 2,2'-diisocyanate and hexamethylene 1,6-diisocyanate.

In an embodiment, the at least one isocyanate is a diphenylmethane 4,4'-diisocyanate (hereinafter referred as MDI). MDI is produced from aniline and formaldehyde feedstocks. Such methods are known to a person skilled in the art. The choice of MDI is not limited to any particular method for preparing the same. Accordingly, the person skilled in the art may obtain MDI by any suitable method. In fact, MDI may be commercially obtained such as, but not limited to, Lupranat® by BASF.

The above process for preparing polyurethane, in step (b), requires providing at least one low molecular weight polyfunctional compound reactive towards isocyanate. The at least one low molecular weight polyfunctional compound reactive towards isocyanate is a chain extender, which serves as a spacer between neighbouring isocyanates. The chain extender structure can have a significant effect on the polyurethane properties because of its ability to drive phase separation, to complement or interfere with a regular hard segment structure and to promote interhard segment hydrogen bonding.

The chain extenders are low molecular weight diol or diamine stringing together the isocyanate. As already discussed hereinabove, the chains of isocyanate and chain extender represent the hard segment of the polyurethane of the present invention. The end isocyanate units of the hard segments are implicitly connected to the polyester polyols, as described hereinabove.

According to a further embodiment, the present invention is also directed to the process for preparing the polyisocyanate polyaddition product as disclosed above, wherein a compound (C—C) having at least two functional groups which are reactive towards isocyante groups is used in the process as chain extender, wherein the compound (C—C) has a molecular weight in the range of from 49 g/mol to 499 g/mol.

By the term "low molecular weight" in the at least one low molecular weight polyfunctional compound reactive towards isocyanate it is referred to a weight average molecular weight in the range of for example 15 to 300 g/mol determined according to DIN 55672-1. More preferably, the weight average molecular weight is in the range of 15 to 250 g/mol, even more preferably in the range of 30 to 250 g/mol determined according to DIN 55672-1. Most preferably, the weight average molecular weight is in the range of 30 to 200 g/mol, particularly preferably in the range of 50 to 150 g/mol determined according to DIN 55672-1. In a particularly preferred embodiment, the weight average molecular weight of the at least one low molecular weight polyfunctional compound reactive towards isocyanate is in the range of 50 to 100 g/mol determined according to DIN 55672-1.

The ratio between the at least one isocyanate to the at least one low molecular weight polyfunctional compound reactive towards isocyanate is preferably in the range of ≥2:1 to ≤5:1 by weight. More preferably, the ratio is in the range of ≥2.5:1 to ≤5:1 by weight. Most preferably, the ratio is in the range of ≥2.5:1 to ≤4.5:1, particularly in the range of ≥2.5:1 to ≤4:1 by weight. In a particularly preferred embodiment, the ratio between the at least one isocyanate to the at least one low molecular weight polyfunctional compound reactive towards isocyanate is in the range of ≥3:1 to ≤4:1 by weight. The at least one isocyanate together with the at least one low molecular weight polyfunctional compound reactive towards isocyanate constitutes the hard segment of the polyurethane, described hereinabove.

According to a further embodiment, the present invention is also directed to the polyisocyanate polyaddition product as disclosed above, wherein the compound (C—C) comprises aromatic moieties.

The chain extender preferably is at least one low molecular weight aromatic diol By the term "low molecular weight", it refers to an aromatic diol having a molecular weight in the range of ≥50 to ≤350 g/mol. Preferably, the at least one low molecular weight aromatic diol has a molecular weight in the range of ≥60 to ≤350 g/mol. More preferably, the molecular weight is in the range of ≥60 to ≤330 g/mol, even more preferably in the range of ≥70 to ≤330 g/mol, or ≥70 to ≤310 g/mol, or ≥80 to ≤310 g/mol, or ≥80 to ≤290 g/mol, or ≥90 to ≤290 g/mol, or ≥90 to ≤270 g/mol. Most preferably, the molecular weight is in the range of ≥100 to ≤270 g/mol, or ≥100 to ≤250 g/mol, or ≥110 to ≤250 g/mol, or ≥110 to ≤230 g/mol, or ≥120 to ≤230 g/mol, ≥120 to ≤210 g/mol. Even most preferably, the molecular weight is in the range of ≥120 to ≤190 g/mol, or ≥120 to ≤170 g/mol. In a particularly preferable embodiment, the at least one low molecular weight aromatic diol has a molecular weight in the range of ≥120 to ≤160 g/mol.

The at least one low molecular weight aromatic diol, as described hereinabove, is at least one $C_6$ to $C_{14}$ aromatic diol having a molecular weight in the range of ≥50 to ≤350 g/mol. Preferably, the at least one $C_6$ to $C_{14}$ aromatic diol is at least one $C_6$ to $C_{14}$ alkylaryl diol having a molecular weight in the range of ≥50 to ≤350 g/mol. For the purpose of the present invention, the term "$C_6$ to $C_{14}$" in the at least one $C_6$ to $C_{14}$ aromatic diol or $C_6$ to $C_{14}$ alkylaryl diol illustrates the total number of carbon atoms i.e. to say the total number of carbon atoms including those in the aromatic ring and the groups attached thereto.

Preferably, the at least one $C_6$ to $C_{14}$ alkylaryl diol is at least one $C_6$ to $C_{12}$ alkylaryl diol. More preferably, the at least one $C_6$ to $C_{14}$ alkylaryl diol is at least one $C_6$ to $C_{10}$ alkylaryl diol. Most preferably, the at least one $C_6$ to $C_{14}$ alkylaryl diol is at least one $C_6$ to $C_8$ alkylaryl diol. In a particularly preferably embodiment, the at least one $C_6$ to $C_{14}$ alkylaryl diol is a $C_8$ alkylaryl diol or benzene dimethanol.

According to a further embodiment, the present invention is also directed to the polyisocyanate polyaddition product as disclosed above, wherein the compound (C—C) is 1,4-benzenedimethanol.

Benzene dimethanol exists as several isomers. These isomers have been found to be equally suitable for the purpose of the present invention. Accordingly, the at least one low molecular weight aromatic diol as a $C_8$ alkylaryl diol or benzene dimethanol is selected from the group consisting of 1,2-benzene dimethanol, 1,3-benzene dimethanol and 1,4-benzene dimethanol. In a particularly preferable embodiment, the at least one low molecular weight aromatic diol (a13) is 1,4-benzene dimethanol.

The polyisocyanate polyaddition product, in particular the polyurethane, as described hereinabove, may also comprise further chain extenders. Such at least one other chain extender might be at least one secondary diol.

Further chain extenders might be selected from the group consisting of water, ethylene glycol, diethylene glycol, triethylene glycol, 1,3-propanediol, 1,4-butanediol, 1,5-pentanediol, 1,6-hexanediol, triethanolamine, glycerine and a mixture thereof.

In a further embodiment, the weight ratio between the at least one $C_6$ to $C_{14}$ aromatic diol to the at least one secondary diol is in the range of ≥1:9 to ≤9:1.

The present process being according to one embodiment a one-shot process for preparing polyurethane, requires simultaneous reaction between polyester polyol, isocyanate and low molecular weight polyfunctional compound reactive towards isocyanate.

The polymerization reaction between the above described reactants may optionally take place in the presence of at least one catalyst and/or at least one additive. A person skilled in the art is aware of such catalysts. The choice and selection of the at least one catalyst does not limit the process of the present invention. However, it is advantageous to use basic polyurethane catalysts, for instance tertiary amines such as triethylamine, tributylamine, dimethylbenzylamine, dicyclohexylmethylamine, dimethylcyclohexylamine, bis(N,N-dimethyaminoethyl) ether, bis(dimethylaminopropyl) urea, N-methylmorpholine or N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, 1-azabicyclo[2.2.0]octane, 1,4-diazabicyclo[2.2.2]octane (Dabco) and alkanolamine compounds, such as triethanolamine, triisopropanolamine, N-methyldiethanolamine and N-ethyldiethanolamine, dimethylaminoethanol, 2-(N,N-dimethylaminoethoxy)ethanol, N,N',N"-tris (dialkylaminoalkyl)hexahydrotriazines, e.g. N,N',N"-tris (dimethylaminopropyl)-s-hexahydrotriazine, and triethylenediamine. However, metal salts such as iron(II) chloride, zinc chloride, lead octoate and preferably tin salts such as tin dioctoate, tine diethylhexoate and dibutyltin dilaurate and also, in particular, mixtures of tertiary amines and organic tin salts are also suitable.

The at least one additive is selected from the group consisting of hydrolysis stabilizer, blowing agent, flame retardant, filler, UV stabilizer and antioxidant.

Accordingly, the process of the present invention encompasses a polymerization reaction between polyester polyol, the at least one isocyanate and the at least one low molecular weight polyfunctional compound reactive towards isocyanate optionally in the presence of at least one catalyst and/or with at least one additive, as described hereinabove, results in a polyurethane having a hard segment fraction in the range of ≥0.10 to ≤0.90 and a $T_g$ in the range of ≥−30° C. to ≤80° C. determined by differential scanning calorimetry according to DIN EN ISO 11357-1 at a heating rate of 20 K/min, the hard segment fraction being defined by the formula:

$$\text{Hard segment fraction} = \left\{ \sum_{x=1}^{k} [(m_{KV,Cl}/M_{KV,Cl}) * M_{Iso} + m_{KV,Cl}] \right\} / m_{total}$$

wherein, $m_{KV,Cl}$ is the mass of the low molecular weight polyfunctional compound reactive towards isocyanate in g, $M_{KV,Cl}$ is the molar mass of the low molecular weight polyfunctional compound reactive towards isocyanate in g/mol, $M_{Iso}$ is the molar mass of the isocyanate in g/mol, $m_{total}$ is the total mass of all the starting materials in g, k is the number of low molecular weight polyfunctional compound reactive towards isocyanate, and wherein the low molecular weight polyfunctional compound reactive towards isocyanate has a weight average molecular weight in the range of 15 to 300 g/mol determined according to DIN 55672-1.

Preferably, the hard segment fraction in the polyurethane is in the range of ≥0.10 to ≤0.80. More preferably, the hard segment fraction is in the range of ≥0.10 to ≤0.70. Most preferably, the hard segment fraction is in the range of ≥0.10 to ≤0.60. In a particularly preferred embodiment, the hard segment fraction in the polyurethane obtained by the process, as described hereinabove, is in the range of ≥0.10 to ≤0.50.

Since the polyurethane of the present invention is a segmented polyurethane, it is to be understood that the remaining fraction refers to the soft segment. Further, the hard segment fraction may also be represented as % by multiplying the hard segment fraction value with 100.

Preferably, the $T_g$ of the polyurethane, as described hereinabove, is in the range of ≥−30° C. to ≤70° C. determined by differential scanning calorimetry according to DIN EN ISO 11357-1 at a heating rate of 20 K/min. More preferably, the $T_g$ is in the range of ≥−30° C. to ≤60° C., even more preferably in the range of ≥−30° C. to ≤50° C. determined by differential scanning calorimetry according to DIN EN ISO 11357-1 at a heating rate of 20 K/min. Most preferably, the $T_g$ is in the range of ≥−30° C. to ≤40° C., even more preferably in the range of ≥−30° C. to ≤30° C. determined by differential scanning calorimetry according to DIN EN ISO 11357-1 at a heating rate of 20 K/min. In a particularly preferred embodiment, the $T_g$ is in the range of ≥−30° C. to ≤20° C. determined by differential scanning calorimetry according to DIN EN ISO 11357-1 at a heating rate of 20 K/min.

In an embodiment, the polyurethane is a thermoplastic polyurethane. Accordingly, a process for preparing a thermoplastic polyurethane comprises the steps of:

(a) providing a polyester polyol, as described above.
(b) providing at least one diisocyanate and at least one chain extender,
(c) reacting the polyester polyol of step (a) with the step (b) optionally in the presence of at least one catalyst and/or with at least one additive to obtain a thermoplastic polyurethane having a hard segment fraction in the range of ≤0.10 to ≥0.60 and a $T_g$ in the range of ≥−30° C. to ≤20° C. determined by differential scanning calorimetry according to DIN EN ISO 11357-1 at a heating rate of 20 K/min, the hard segment fraction being defined by the formula:

$$\text{Hard segment fraction} = \left\{ \sum_{x=1}^{k} [(m_{KV,CI} / M_{KV,CI}) * M_{Iso} + m_{KV,CI}] \right\} / m_{total}$$

wherein,
$m_{KV,CI}$ is the mass of the chain extender in g,
$M_{KV,CI}$ is the molar mass of the chain extender in g/mol,
$M_{Iso}$ is the molar mass of the diisocyanate in g/mol,
$m_{total}$ is the total mass of all the starting materials in g,
k is the number of chain extender, and
wherein the chain extender has a weight average molecular weight in the range of 50 to 100 g/mol determined according to DIN 55672-1.

Preferably, the thermoplastic polyurethane has the hard segment fraction in the range of ≥0.10 to ≤0.50. More preferably the hard segment fraction is in the range of ≥0.20 to ≤0.50. Most preferably, the hard segment fraction is in the range of ≥0.30 to ≤0.50. In a particularly preferred embodiment, the thermoplastic polyurethane has the hard segment fraction in the range of ≥0.35 to ≤0.50.

Preferably, the $T_g$ of the thermoplastic polyurethane is in the range of ≥−30° C. to ≥15° C. determined by differential scanning calorimetry according to DIN EN ISO 11357-1 at a heating rate of 20 K/min. More preferably, the $T_g$ is in the range of ≥−30° C. to ≤10° C. determined by differential scanning calorimetry according to DIN EN ISO 11357-1 at a heating rate of 20 K/min. Most preferably, the $T_g$ is in the range of ≥−30° C. to ≤5° C., even most preferably in the range of ≥−30° C. to ≤0° C. determined by differential scanning calorimetry according to DIN EN ISO 11357-1 at a heating rate of 20 K/min. In a particularly preferred embodiment, the thermoplastic polyurethane has a $T_g$ in the range of ≥−30° C. to ≤−5° C. determined by differential scanning calorimetry according to DIN EN ISO 11357-1 at a heating rate of 20 K/min.

The thermoplastic polyurethane, as described hereinabove, has a durometer hardness ranging from a Shore A hardness of 70 to a Shore D hardness of 80 determined according to ASTM D2240. Preferably, a Shore A hardness of 75 to a Shore D hardness of 75 determined according to ASTM D2240. More preferably, a Shore A hardness of 80 to a Shore D hardness of 70 determined according to ASTM D2240. Most preferably, a Shore A hardness of 80 to a Shore D hardness of 65 determined according to ASTM D2240. In a particularly preferred embodiment, the thermoplastic polyurethane has a durometer hardness ranging from a Shore A hardness of 80 to a Shore D hardness of 60 determined according to ASTM D2240.

The polyisocyanate polyaddition product, in particular the thermoplastic polyurethane (hereinafter referred to as TPU) and the cast polyurethane (hereinafter referred to as CPU) of the presently claimed invention finds wide application in areas such as, but not limited to, automotive industry for cables, in hybrid cars as well as in manufacturing industry for conveyor belts, rollers, seals for gaskets and in railway pads due to the improved thermal resistance, tensile strength, compression set value and creep performance over a broad shore hardness ranging from a Shore A hardness of 70 to a Shore D hardness of 80 determined according to ASTM D2240, as illustrated in the examples hereinbelow.

According to a further aspect, the present invention is directed to an article, comprising a polyisocyanate polyaddition product as disclosed above or a polyisocyanate polyaddition product obtained or obtainable according to a process as disclosed above.

According to a further embodiment, the present invention is also directed to the article as disclosed above, wherein the article is a cable, conveyor belt, roller, seal for gasket or railway pad.

According to a further aspect, the present invention is directed to the use of a polyisocyanate polyaddition product as disclosed above or a polyisocyanate polyaddition product obtained or obtainable according to a process as disclosed above in a cable, conveyor belt, roller, seal for gasket or railway pad.

The present invention is further illustrated by the following embodiments and combinations of embodiments as indicated by the respective dependencies and back-references. In particular, it is noted that in each instance where a range of embodiments is mentioned, for example in the context of a term such as "The . . . of any of embodiments 1 to 4", every embodiment in this range is meant to be explicitly disclosed for the skilled person, i.e. the wording of this term is to be understood by the skilled person as being synonymous to "The . . . of any of embodiments 1, 2, 3, and 4".

1. A polyester polyol comprising:
   (A) ≥10 wt.-% to ≤70 wt.-% of at least one $C_4$ to $C_{12}$ aliphatic dicarboxylic acid,
   (B) ≥10 wt.-% to ≤70 wt.-% of at least one $C_2$ to $C_{10}$ diol, and
   (C) ≥10 wt.-% to ≤70 wt.-% of at least one alkoxylated $C_{10}$ to $C_{14}$ aromatic diol,
   wherein wt.-% is based on the total weight of the polyester polyol.
2. The polyester polyol according to embodiment 1, characterized in that the at least one $C_4$ to $C_{12}$ aliphatic dicarboxylic acid is selected from the group consisting of glutaric acid, adipic acid, pimelic acid, suberic acid, azelaic acid, sebacic acid, undecanedioic acid and dodecanedioic acid.
3. The polyester polyol according to embodiment 1 or 2, characterized in that the at least one $C_2$ to $C_{10}$ diol is selected from the group consisting of ethylene glycol, 1,3-propanediol, 1,4-butanediol, 2-methyl-1,3-propanediol, 1,5-pentanediol, 2,4-pentanediol, 2-methyl-2,4-pentanediol, 3-methyl-1,5-pentanediol, 1,6-hexanediol and a mixture thereof.
4. The polyester polyol according to one or more of embodiments 1 to 3, characterized in that the at least one alkoxylated $C_{10}$ to $C_{14}$ aromatic diol has a weight average molecular weight Mw in the range of 200 to 1000 g/mol determined according to DIN 55672-1.
5. The polyester polyol according to one or more of embodiments 1 to 4, characterized in that the at least one alkoxylated $C_{10}$ to $C_{14}$ aromatic diol is an alkoxylation product of at least one $C_{10}$ to $C_{14}$ aromatic diol with at least one $C_2$ to $C_4$ alkylene oxide.

6. The polyester polyol according to one or more of embodiments 1 to 5, characterized in that the $C_{10}$ to $C_{14}$ aromatic diol is a naphthalene diol.
7. The polyester polyol according to one or more of embodiments 1 to 6, characterized in that the polyester polyol has an OH value in the range of ≥30 mg KOH/g to ≤150 mg KOH/g determined according to DIN 53240.
8. The polyester polyol according to one or more of embodiments 1 to 7, characterized in that the polyester polyol has a viscosity in the range of ≥500 mPa·s to ≤2000 mPa·s determined according to DIN EN ISO 3219 at 25° C.
9. A process for preparing a polyurethane, comprising the steps of:
   (a) providing a polyester polyol according to one or more of embodiments 1 to 8,
   (b) providing at least one isocyanate and at least one low molecular weight polyfunctional compound reactive towards isocyanate,
   (c) reacting the polyester polyol of step (a) with step (b) optionally in the presence of at least one catalyst and/or with at least one additive to obtain a polyurethane having a hard segment fraction in the range of ≥0.10 to ≤0.90 and a $T_g$ in the range of ≥−30° C. to ≤80° C. determined by differential scanning calorimetry according to DIN EN ISO 11357-1 at a heating rate of 20 K/min, the hard segment fraction being defined by the formula:

$$\text{Hard segment fraction} = \left\{ \sum_{x=1}^{k} [(m_{KV,CI}/M_{KV,CI}) * M_{Iso} + m_{KV,CI}] \right\} / m_{total}$$

wherein,
$m_{KV,CI}$ the mass of the low molecular weight polyfunctional compound reactive towards isocyanate in g,
$M_{KV,CI}$ the molar mass of the low molecular weight polyfunctional compound reactive towards isocyanate in g/mol,
$M_{Iso}$ the molar mass of the isocyanate in g/mol,
$m_{total}$ is the total mass of all the starting materials in g,
k is the number of low molecular weight polyfunctional compound reactive towards isocyanate, and
wherein the low molecular weight polyfunctional compound reactive towards isocyanate has a weight average molecular weight in the range of 15 to 300 g/mol determined according to DIN 55672-1.
10. The process according to embodiment 9, characterized in that the step (a) further comprises at least one secondary polyol.
11. The process according to embodiment 10, characterized in that the ratio of the polyester polyol to the at least one secondary polyol is in the range of ≥5:95 to ≤70:30 by weight.
12. The process according to one or more of embodiments 9 to 11, characterized in that the at least one isocyanate is a diisocyanate selected from the group consisting of diphenylmethane 4,4'-diisocyanate, tolylene 2,6-diisocyanate, dicyclohexylmethane 2,2'-diisocyanate, hexamethylene 1,6-diisocyanate, paraphenylene 2,4-diisocyanate, tetramethylenexylene 2,4-diisocyanate, 2 methylpentamethylene 1,5 diisocyanate, 2 ethylbutylene 1,4 diisocyanate, pentamethylene 1,5 diisocyanate, butylene 1,4 diisocyanate and 1 isocyanato-3,3,5 trimethyl-5 isocyanatomethylcyclohexane.
13. The process according one or more of embodiments 9 to 12, characterized in that the low molecular weight polyfunctional compound reactive towards isocyanate is a chain extender selected from the group consisting of water, ethylene glycol, diethylene glycol, triethylene glycol, 1,3-propanediol, 1,4-butanediol, 1,5-pentanediol, 1,6-hexanediol, hydroquinone bis 2-hydroxyethyl ether, bis-2(hydroxyl ethyl)-terephthalate, glycerine and triethanolamine.
14. The process according to one or more of embodiments 9 to 13, characterized in that the at least one additive is selected from the group consisting of hydrolysis stabilizer, blowing agent, flame retardant, filler, UV stabilizer and antioxidant.
15. A polyurethane obtained by the process according to one or more of embodiments 9 to 14, having a hard segment fraction in the range of ≥0.10 to ≤0.90 and a $T_g$ in the range of ≥−30° C. to ≤80° C. determined by differential scanning calorimetry according to DIN EN ISO 11357-1 at a heating rate of 20 K/min.
16. A polyurethane comprising:
   (a) at least one polyol,
   (b) at least one polyisocyanate, and
   (c) at least one low molecular weight aromatic diol,
   wherein the polyurethane has a hard segment fraction in the range of ≥0.10 to ≤0.90 and a $T_g$ in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{ \sum_{x=1}^{k} [(m_{KV,AD}/M_{KV,AD}) * M_{Iso} + m_{KV,AD}] \right\} / m_{total}$$

wherein,
$M_{KV,AD}$ is the mass of the at least one low molecular weight aromatic diol (c) in g,
$M_{KV,AD}$ is the molar mass of the at least one low molecular weight aromatic diol (c) in g/mol,
$M_{Iso}$ is the molar mass of the at least one polyisocyanate (b) in g/mol,
$m_{total}$ is the total mass of all the starting materials in g,
k is the number of low molecular weight aromatic diol (c),
wherein the at least one low molecular weight aromatic diol (c) has a molecular weight in the range of 50 to 350 g/mol.
17. The polyurethane according to embodiment 16, characterized in that the at least one polyol (a) is selected from the group consisting of polyester polyol (a1), polyether polyol (a2) and polycarbonate polyol (a3).
18. The polyurethane according to embodiment 16 or 17, characterized in that the polyester polyol (a1) comprises:
   (a11) ≥10 wt.-% to ≤70 wt.-% of at least one $C_4$ to $C_{12}$ aliphatic dicarboxylic acid,
   (a12) ≥10 wt.-% to ≤70 wt.-% of at least one $C_2$ to $C_{10}$ diol, and
   (a13) ≥0 wt.-% to ≤30 wt.-% of at least one low molecular weight aromatic diol having a molecular weight in the range of ≥50 to ≤350 g/mol,
   wherein wt.-% is based on the total weight of the polyester polyol.
19. The polyurethane according to one or more of embodiments 16 to 18, characterized in that the polyester polyol (a1) comprises ≥10 wt.-% to ≤30 wt.-% of at least one low molecular weight aromatic diol (a13) having a molecular weight in the range of ≥50 to ≤350 g/mol.
20. The polyurethane according to one or more of embodiments 16 to 19, characterized in that the at least one low molecular weight aromatic diol (a13) is at least one $C_6$ to $C_{14}$ aromatic diol (a131).
21. The polyurethane according to one or more of embodiments 16 to 20, characterized in that the at least one polyisocyanate (b) is selected from the group consisting of 2,2'-, 2,4'- and 4,4'-diphenylmethane diisocyanate, 2,4- and 2,6-toluene diisocyanate, 1,2-, 1,3- and 1,4-cyclohexane diisocyanates, hexamethylene 1,6-diisocyanate, 2-methyl-1,5-pentamethylene diisocyanate, pentamethylene 1,5-diisocyanate, tetramethylene 1,4-diisocyanate and isophorone diisocyanate.
22. The polyurethane according to one or more of embodiments 16 to 21, characterized in that the at least one low molecular weight aromatic diol (c) is at least one $C_6$ to $C_{14}$ aromatic diol (c1).
23. The polyurethane according to one or more of embodiments 16 to 22, characterized in that the at least one low molecular weight aromatic diol (c) further comprises at least one secondary diol (c2) selected from the group consisting of aliphatic diols (c21), aromatic diols (c22) and a mixture thereof.
24. The polyurethane according to one or more of embodiments 16 to 23, characterized in that the weight ratio between the at least one $C_6$ to $C_{14}$ aromatic diol (c1) to the at least one secondary diol (c2) is in the range of ≥1:9 to ≤9:1.
25. The polyurethane according to one or more of embodiments 16 to 24, characterized in that the at least one low molecular weight aromatic diol (a13) and the at least one low molecular weight aromatic diol (c) are identical.
26. The polyurethane according to one or more of embodiments 16 to 25, characterized in that the weight ratio between the at least one polyol (a) to the at least one polyisocyanate (b) is in the range of ≥1:1 to ≤5:1.
27. A two-shot process for preparing a polyurethane according to one or more of embodiments 16 to 26, comprising the steps of:
(A) preparing a prepolymer comprising at least one polyol (a) and at least one polyisocyanate (b),
(B) heating the prepolymer of step (A) to a temperature in the range of ≥20° C. to ≤100° C. for a period in the range of ≥0.1 h to ≤20 h,
(C) heating the at least one low molecular weight aromatic diol (c) to a temperature in the range of ≥100° C. to ≤140° C. to obtain a melted diol,
(D) mixing the prepolymer of step (B) with the melted diol of step (C) at a temperature in the range of ≥110° C. to ≤150° C., optionally in the presence of at least one catalyst (e) and/or at least one additive (d), to obtain a polyurethane.
28. A one-shot process for preparing a polyurethane according to one or more of embodiments 16 to 26, comprising the steps of:
(A') providing at least one polyol (a),
(B') providing at least one polyisocyanate (b) and at least one low molecular weight aromatic diol (c)
(C') reacting the at least one polyol (a) of step (A') with step (B') optionally in the presence of at least one catalyst (e) and/or with at least one additive (d) to obtain a polyurethane.
29. A polyurethane obtained by the two-shot process according to embodiment 27 or the one-shot process according to embodiment 28, characterized in that the polyurethane is a cast polyurethane or a thermoplastic polyurethane having the hard segment fraction in the range of ≥0.10 to ≤0.90 and a $T_g$ in the range of ≥−40° C. to ≤80° C. determined by differential scanning calorimetry according to DIN EN ISO 11357-1 at a heating rate of 20 K/min.
30. Use of the polyurethane according to one or more of embodiments 16 to 26 or the polyurethane according to embodiment 29 in a cable, conveyor belt, roller, seal for gasket or railway pad.
31. A process for preparing a polyurethane comprising the steps of:
(a) providing a polyester polyol as disclosed hereinabove,
(b) providing at least one isocyanate and at least one low molecular weight polyfunctional compound reactive towards isocyanate,
(c) reacting the polyester polyol of step (a) with step (b) optionally in the presence of at least one catalyst and/or with at least one additive to obtain a polyurethane having a hard segment fraction in the range of ≥0.10 to ≤0.90 and a $T_g$ in the range of ≥−30° C. to ≤80° C. determined by differential scanning calorimetry according to DIN EN ISO 11357-1 at a heating rate of 20 K/min, the hard segment fraction being defined by the formula:

$$\text{Hard segment fraction} = \left\{ \sum_{x=1}^{k} [(m_{KV,CI} / M_{KV,CI}) * M_{Iso} + m_{KV,CI}] \right\} / m_{total}$$

wherein,
$M_{KV,CI}$ is the mass of the low molecular weight polyfunctional compound reactive towards isocyanate in g,
$M_{KV,CI}$ is the molar mass of the low molecular weight polyfunctional compound reactive towards isocyanate in g/mol,
$M_{Iso}$ is the molar mass of the isocyanate in g/mol,
$m_{total}$ is the total mass of all the starting materials in g,
k is the number of low molecular weight polyfunctional compound reactive towards isocyanate, and
wherein the low molecular weight polyfunctional compound reactive towards isocyanate has a weight average molecular weight in the range of 15 to 300 g/mol determined according to DIN 55672-1.
32. In an embodiment of the presently claimed invention, the above process is characterized in that the step (a) further comprises at least one secondary polyol.
33. In another embodiment of the presently claimed invention, the above process is characterized in that the ratio of the polyester polyol to the at least one secondary polyol is in the range of ≥5:95 to ≤70:30 by weight.
34. In another embodiment of the presently claimed invention, the above process is characterized in that the secondary polyol is selected from the group consisting of a polyester polyol, polyether polyol or a mixture thereof.
35. In another embodiment of the presently claimed invention, the above process is characterized in that in step (b) the ratio of the at least one isocyanate to the at least one low molecular weight polyfunctional compound reactive towards isocyanate is in the range of ≥2:1 to ≤5:1 by weight.
36. In another embodiment of the presently claimed invention, the above process is characterized in that the at least one isocyanate is a diisocyanate selected from the group consisting of diphenylmethane 4,4'-diisocyanate, tolylene 2,6-diisocyanate, dicyclohexylmethane 2,2'-diisocyanate, hexamethylene 1,6-diisocyanate, paraphenylene 2,4-diisocyanate, tetramethylenexylene 2,4-diisocyanate, 2-methylpentamethylene 1,5 diisocyanate, 2 ethylbutylene 1,4 diisocyanate, pentamethylene 1,5 diisocyanate, butylene 1,4 diisocyanate and 1 isocyanato-3,3,5 trimethyl-5 isocyanatomethylcyclohexane.

37. In another embodiment of the presently claimed invention, the above process is characterized in that in step (b) the low molecular weight polyfunctional compound reactive towards isocyanate has a weight average molecular weight in the range of 15 to 300 g/mol determined according to DIN 55672-1.

38. In another embodiment of the presently claimed invention, the above process is characterized in that the low molecular weight polyfunctional compound reactive towards isocyanate is a chain extender selected from the group consisting of water, ethylene glycol, diethylene glycol, triethylene glycol, 1,3-propanediol, 1,4-butanediol, 1,5-pentanediol, 1,6-hexanediol, hydroquinone bis 2-hydroxyethyl ether, bis-2(hydroxyl ethyl)-terephthalate, glycerine and triethanolamine.

39. In another embodiment of the presently claimed invention, the above process is characterized in that the at least one additive is selected from the group consisting of hydrolysis stabilizer, blowing agent, flame retardant, filler, UV stabilizer and antioxidant.

40. In another embodiment of the presently claimed invention, the above process is characterized in that the polyurethane is a thermoplastic polyurethane having the hard segment fraction in the range of ≥0.10 to ≤0.60 and a $T_g$ in the range of ≥−30° C. to ≤−5° C. determined by differential scanning calorimetry according to DIN EN ISO 11357-1 at a heating rate of 20 K/min.

41. In another embodiment of the presently claimed invention, the above process is characterized in that the thermoplastic polyurethane has a durometer hardness ranging from a Shore A hardness of 70 to a Shore D hardness of 80 determined according to ASTM D2240.

42. In a further aspect of the presently claimed invention, a polyurethane obtained by the above process having a hard segment fraction in the range of ≥0.10 to ≤0.90 and a $T_g$ in the range of ≥−30° C. to ≤80° C. determined by differential scanning calorimetry according to DIN EN ISO 11357-1 at a heating rate of 20 K/min.

43. In an embodiment of the presently claimed invention, the above polyurethane is a thermoplastic polyurethane having the hard segment fraction in the range of ≥0.10 to ≤0.60 and a $T_g$ in the range of ≥−30° C. to ≤−5° C. determined by differential scanning calorimetry according to DIN EN ISO 11357-1 at a heating rate of 20 K/min and a durometer hardness ranging from a Shore A hardness of 70 to a Shore D hardness of 80 determined according to ASTM D2240.

44. A polyurethane comprising:
(a) at least one polyol,
(b) at least one polyisocyanate, and
(c) at least one low molecular weight aromatic diol,
wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein,
$M_{KV,AD}$ is the mass of the at least one low molecular weight aromatic diol (c) in g,
$M_{KV,AD}$ is the molar mass of the at least one low molecular weight aromatic diol (c) in g/mol,
$M_{Iso}$ is the molar mass of the at least one polyisocyanate (b) in g/mol,
$m_{total}$ is the total mass of all the starting materials in g,
k is the number of low molecular weight aromatic diol (c),
wherein the at least one low molecular weight aromatic diol (c) has a molecular weight in the range of ≥50 to ≤350 g/mol.

45. In an embodiment of the presently claimed invention, the above polyurethane is characterized in that the at least one low molecular weight aromatic diol (c) has a molecular weight in the range of ≥100 to ≤200 g/mol.

46. In another embodiment of the presently claimed invention, the above polyurethane is characterized in that the at least one polyol (a) has an OH value in the range of ≥30 mg KOH/g to ≤150 mg KOH/g determined according to DIN 53240.

47. In another embodiment of the presently claimed invention, the above polyurethane is characterized in that the at least one polyol (a) has a viscosity in the range of ≥500 mPa·s to ≤2000 mPa·s determined according to DIN EN ISO 3219 at 25° C.

48. In another embodiment of the presently claimed invention, the above polyurethane is characterized in that the at least one polyol (a) is selected from the group consisting of polyester polyol (a1), polyether polyol (a2) and polycarbonate polyol (a3).

49. In another embodiment of the presently claimed invention, the above polyurethane is characterized in that the polyether polyol (a2) is derived from the group consisting of ethylene oxide, propylene oxide, tetrahydrofuran and a mixture thereof.

50. In another embodiment of the presently claimed invention, the above polyurethane is characterized in that the polyether polyol (a2) is derived from tetrahydrofuran.

51. In another embodiment of the presently claimed invention, the above polyurethane is characterized in that the polyester polyol (a1) comprises:
(a11) ≥10 wt.-% to ≤70 wt.-% of at least one $C_4$ to $C_{12}$ aliphatic dicarboxylic acid,
(a12) ≥10 wt.-% to ≤70 wt.-% of at least one $C_2$ to $C_{10}$ diol, and
(a13) ≥0 wt.-% to ≤30 wt.-% of at least one low molecular weight aromatic diol having a molecular weight in the range of ≥50 to ≤350 g/mol, wherein wt.-% is based on the total weight of the polyester polyol.

52. In another embodiment of the presently claimed invention, the above polyurethane is characterized in that the polyester polyol (a1) comprises ≥10 wt.-% to ≤30 wt.-% of at least one low molecular weight aromatic diol (a13) having a molecular weight in the range of ≥50 to ≤350 g/mol.

53. In another embodiment of the presently claimed invention, the above polyurethane is characterized in that the at least one $C_4$ to $C_{12}$ aliphatic dicarboxylic acid (a11) is selected from the group consisting of glutaric acid, adipic acid, pimelic acid, suberic acid, azelaic acid, sebacic acid, undecanedioic acid and dodecanedioic acid.

54. In another embodiment of the presently claimed invention, the above polyurethane is characterized in that the at least one $C_2$ to $C_{10}$ diol (a12) is selected from the group consisting of ethylene glycol, 1,3-propanediol, 1,4-butanediol, 2-methyl-1,3-propanediol, 1,5-pentanediol, 2,4-pentanediol, 2-methyl-2,4-pentanediol, 3-methyl-1,5-pentanediol and 1,6-hexanediol.

55. In another embodiment of the presently claimed invention, the above polyurethane is characterized in that at least one low molecular weight aromatic diol (a13) is at least one $C_6$ to $C_{14}$ aromatic diol (a131).

56. In another embodiment of the presently claimed invention, the above polyurethane is characterized in that the at least one polyisocyanate (b) is selected from the group consisting of aliphatic polyisocyanate (b1), cycloaliphatic polyisocyanate (b2) and aromatic polyisocyanate (b3).

57. In another embodiment of the presently claimed invention, the above polyurethane is characterized in that the aliphatic polyisocyanate (b1) is selected from the group consisting of tetramethylene 1,4-diisocyanate, pentamethylene 1,5-diisocyanate, hexamethylene 1,6-diisocyanate, decamethylene diisocyanate, 1,12-dodecane diisocyanate, 2,2,4-trimethyl-hexamethylene diisocyanate, 2,4,4-trimethyl-hexamethylene diisocyanate and 2-methyl-1,5-pentamethylene diisocyanate.

58. In another embodiment of the presently claimed invention, the above polyurethane is characterized in that the cycloaliphatic polyisocyanate (b2) is selected from the group consisting of cyclobutane-1,3-diisocyanate, 1,2-, 1,3- and 1,4-cyclohexane diisocyanates, 2,4- and 2,6-methylcyclohexane diisocyanate, 4,4'- and 2,4'-dicyclohexyldiisocyanates, 1,3,5-cyclohexane triisocyanates, isocyanatomethylcyclohexane isocyanates, isocyanatoethylcyclohexane isocyanates, bis(isocyanatomethyl)-cyclohexane diisocyanates, 4,4'- and 2,4'-bis(isocyanatomethyl) dicyclohexane and isophorone diisocyanate.

59. In another embodiment of the presently claimed invention, the above polyurethane is characterized in that the aromatic polyisocyanate (b3) is selected from the group consisting 2,4- and 2,6-hexahydrotoluenediisocyanate, 1,2-, 1,3-, and 1,4-phenylene diisocyanates, triphenyl methane-4,4',4"-triisocyanate, naphthylene-1,5-diisocyanate, 2,4- and 2,6-toluene diisocyanate, 2,4'-, 4,4'- and 2,2-biphenyl diisocyanates, 2,2'-, 2,4'- and 4,4'-diphenylmethane diisocyanate, polyphenyl polymethylene polyisocyanates, 1,2-, 1,3- and 1,4-xylylene diisocyanates and m-tetramethylxylyene diisocyanate (TMXDI).

60. In another embodiment of the presently claimed invention, the above polyurethane is characterized in that the at least one polyisocyanate (b) is selected from the group consisting of 2,2'-, 2,4'- and 4,4'-diphenylmethane diisocyanate, 2,4- and 2,6-toluene diisocyanate, 1,2-, 1,3- and 1,4-cyclohexane diisocyanates, hexamethylene 1,6-diisocyanate, 2-methyl-1,5-pentamethylene diisocyanate, pentamethylene 1,5-diisocyanate, tetramethylene 1,4-diisocyanate and isophorone diisocyanate.

61. In another embodiment of the presently claimed invention, the above polyurethane is characterized in that the at least one low molecular weight aromatic diol (c) is at least one $C_6$ to $C_{14}$ aromatic diol (c1).

62. In another embodiment of the presently claimed invention, the above polyurethane is characterized in that the at least one $C_6$ to $C_{14}$ aromatic diol (c1) is at least one $C_6$ to $C_{14}$ alkylaryl diol (c11).

63. In another embodiment of the presently claimed invention, the above polyurethane is characterized in that the at least one $C_6$ to $C_{14}$ alkylaryl diol (c11) is benzene dimethanol.

64. In another embodiment of the presently claimed invention, the at least one aromatic diol (c) of the above polyurethane further comprises at least one secondary diol (c2) selected from the group consisting of aliphatic diols (c21), aromatic diols (c22) and a mixture thereof.

65. In another embodiment of the presently claimed invention, the above polyurethane is characterized in that the at least one aliphatic diol (c21) is selected from the group consisting of water, ethylene glycol, diethylene glycol, triethylene glycol, 1,3-propanediol, 1,4-butanediol, 1,5-pentanediol, 1,6-hexanediol, triethanolamine, glycerine and a mixture thereof.

66. In another embodiment of the presently claimed invention, the above polyurethane is characterized in that the at least one aromatic diol (c22) is selected from the group consisting of hydroquinone bis 2-hydroxyethyl ether, bis-2(hydroxyl ethyl)-terephthalate and a mixture thereof.

67. In another embodiment of the presently claimed invention, the above polyurethane is characterized in that the weight ratio between the at least one $C_6$ to $C_{14}$ aromatic diol (c1) to the at least one secondary diol (c2) is in the range of $\geq 1:9$ to $\leq 9:1$.

68. In another embodiment of the presently claimed invention, the above polyurethane is characterized in that the at least one low molecular weight aromatic diol (a13) and the at least one low molecular weight aromatic diol (c) are identical.

68.a In another embodiment of the presently claimed invention, the above polyurethane is characterized in that the weight ratio between the at least one polyol (a) to the at least one polyisocyanate (b) is in the range of $\geq 1:1$ to $\leq 5:1$.

69. In another embodiment of the presently claimed invention, the above polyurethane is characterized in that the weight ratio between the at least one polyisocyanate (b) to the at least one low molecular weight aromatic diol (c) is in the range of $\geq 2:1$ to $\leq 5:1$.

70. In another embodiment of the presently claimed invention, the above polyurethane further comprises at least one additive (d) selected from the group consisting of hydrolysis stabilizer, blowing agent, flame retardant, filler, UV stabilizer and antioxidant.

71. In another embodiment of the presently claimed invention, the above polyurethane is characterized in that the polyurethane is a thermoplastic polyurethane or a cast polyurethane.

72. In another aspect, the presently claimed invention is directed to a two-shot process for preparing a polyurethane comprises the steps of:
(A) preparing a pre-polymer comprising at least one polyol (a) and at least one polyisocyanate (b),
(B) heating the pre-polymer of step (A) to a temperature in the range of $\geq 20°$ C. to $\leq 100°$ C. for a period in the range of $\geq 0.1$ h to $\leq 20$ h,
(C) heating the at least one low molecular weight aromatic diol (c) to a temperature in the range of $\geq 100°$ C. to $\leq 140°$ C. to obtain a melted diol,
(D) mixing the pre-polymer of step (B) with the melted diol of step (C) at a temperature in the range of $\geq 110°$ C. to $\leq 150°$ C., optionally in the presence of at least one catalyst (e) and/or at least one additive (d), to obtain a polyurethane having the hard segment fraction in the range of $\geq 0.10$ to $\leq 0.90$ and Tg in the range of $\geq -40°$ C. to ≤80° C. determined by differential scanning calorimetry according to DIN EN ISO 11357-1 at the heating rate of 20 K/min the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein, $m_{KV,AD}$ is the mass of the at least one low molecular weight aromatic diol (c) in g, $M_{KV,AD}$ is the molar mass of the at least one low molecular weight aromatic diol (c) in g/mol, $M_{Iso}$ is the molar mass of the at least one polyisocyanate (b) in g/mol, $m_{total}$ is the total mass of all the starting materials in g, k is the number of low molecular weight aromatic diol (c), wherein the at least one low molecular weight aromatic diol (c) has a molecular weight in the range of ≥50 to ≤350 g/mol.

73. In an embodiment of the presently claimed invention, the above two-shot process further comprises the steps of:

(E) casting the polyurethane of step (D) in a mold at a temperature in the range of ≥100° C. to ≤150° C. to obtain a molded polyurethane, (F) annealing the molded polyurethane of step (E) at a temperature in the range of ≥90° C. to ≤140° C. for a period in the range of ≥10 h to ≤20 h.

74. In another embodiment of the presently claimed invention, the above two-shot process is characterized in that in step (A) the pre-polymer is obtained by:

a) mixing the at least one polyol (a) with the at least one polyisocyanate (b) at a temperature in the range of ≥30° C. to ≤70° C. to obtain a polymeric mixture, b) heating the polymeric mixture of step a) at a temperature in the range of ≥60° C. to ≤100° C. and mixing for a period in the range of ≥1 h to ≤5 h, c) cooling the polymeric mixture of step b) to a temperature in the range of ≥15° C. to ≤40° C. to obtain a pre-polymer, wherein the pre-polymer has a viscosity in the range of ≥300 mPa·s to ≤20,000 mPa·s determined according to DIN EN ISO 3219 at 25° C. and an isocyanate content in the range of ≥2% to ≤15% determined according to DIN EN ISO 11909.

75. In another embodiment of the presently claimed invention, the above two-shot process is characterized in that in step (A) the weight ratio between the at least one polyol (a) to the at least one polyisocyanate (b) is in the range of ≥1:1 to ≤5:1.

76. In another embodiment of the presently claimed invention, the above two-shot process is characterized in that in step (C) the at least one low molecular weight aromatic diol (c) further comprises at least one secondary diol (c2).

77. In another embodiment of the presently claimed invention, the above two-shot process is characterized in that in step (D) the weight ratio between the pre-polymer and the melted diol is in the range of ≥5:1 to ≤10:1.

78. In a further aspect, the present invention is directed to a one-shot process for preparing a polyurethane comprising the steps of:

A') providing at least one polyol (a),

B') providing at least one polyisocyanate (b) and at least one low molecular weight aromatic diol (c), C') reacting the at least one polyol (a) of step (A') with step (B') optionally in the presence of at least one catalyst (e) and/or with at least one additive (d) to obtain a polyurethane having a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein, $m_{KV,AD}$ is the mass of the at least one low molecular weight aromatic diol (c) in g, $M_{KV,AD}$ is the molar mass of the at least one low molecular weight aromatic diol (c) in g/mol, $M_{Iso}$ is the molar mass of the at least one polyisocyanate (b) in g/mol, $m_{total}$ is the total mass of all the starting materials in g, k is the number of low molecular weight aromatic diol (c), wherein the at least one low molecular weight aromatic diol (c) has a molecular weight in the range of ≥50 to ≤350 g/mol.

79. In an embodiment of the presently claimed invention, the above one-shot process is characterized in that in step (B') the at least one low molecular weight aromatic diol (c) further comprises at least one secondary diol (c2).

80. In yet another aspect, the present invention is directed to a polyurethane obtained by the two-shot process or the one-shot process characterized in that the polyurethane is a cast polyurethane or a thermoplastic polyurethane having the hard segment in the range of ≥0.10 to ≤0.90 and a $T_g$ in the range of ≥−40° C. to ≤80° C. determined by differential scanning calorimetry according to DIN EN ISO 11357-1 at a heating rate of 20 K/min.

81. In still another aspect, the present invention is directed to use of the above polyurethane in a cable, conveyor belt, roller, seal for gasket or railway pad.

82. Accordingly, in an embodiment, the polyurethane as described hereinabove comprises:

(a) at least one polyol, (b) at least one polyisocyanate, and (c) at least one $C_6$ to $C_{14}$ alkylaryl diol, wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein, $m_{KV,AD}$ is the mass of the at least one $C_6$ to $C_{14}$ alkylaryl diol (c) in g, $M_{KV,AD}$ is the molar mass of the at least one $C_6$ to $C_{14}$ alkylaryl diol (c) in g/mol, $M_{Iso}$ is the molar mass of the at least one polyisocyanate (b) in g/mol, $m_{total}$ is the total mass of all the starting materials in g, k is the number of $C_6$ to $C_{14}$ alkylaryl diol (c), wherein the at least one $C_6$ to $C_{14}$ alkylaryl diol (c) has a molecular weight in the range of ≥50 to ≤350 g/mol.

83. In another embodiment, the polyurethane as described hereinabove comprises:
(a) at least one polyol,
(b) at least one polyisocyanate, and
(c) at least one $C_6$ to $C_{12}$ alkylaryl diol,
wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{\sum_{x=1}^{k}[(m_{KV,AD}/M_{KV,AD})*M_{Iso}+m_{KV,AD}]\right\}/m_{total}$$

wherein, $m_{KV,AD}$ is the mass of the at least one $C_6$ to $C_{12}$ alkylaryl diol (c) in g, $M_{KV,AD}$ is the molar mass of the at least one $C_6$ to $C_{12}$ alkylaryl diol (c) in g/mol, $M_{Iso}$ is the molar mass of the at least one polyisocyanate (b) in g/mol, $m_{total}$ is the total mass of all the starting materials in g, k is the number of $C_6$ to $C_{12}$ alkylaryl diol (c), wherein the at least one $C_6$ to $C_{12}$ alkylaryl diol (c) has a molecular weight in the range of ≥50 to ≤350 g/mol.

84. In another embodiment, the polyurethane as described hereinabove comprises:
(a) at least one polyol,
(b) at least one polyisocyanate, and
(c) at least one $C_6$ to $C_{10}$ alkylaryl diol,
wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{\sum_{x=1}^{k}[(m_{KV,AD}/M_{KV,AD})*M_{Iso}+m_{KV,AD}]\right\}/m_{total}$$

wherein, $m_{KV,AD}$ is the mass of the at least one $C_6$ to $C_{10}$ alkylaryl diol (c) in g, $M_{KV,AD}$ is the molar mass of the at least one $C_6$ to $C_{10}$ alkylaryl diol (c) in g/mol, $M_{Iso}$ is the molar mass of the at least one polyisocyanate (b) in g/mol, $m_{total}$ is the total mass of all the starting materials in g, k is the number of $C_6$ to $C_{10}$ alkylaryl diol (c), wherein the at least one $C_6$ to $C_{10}$ alkylaryl diol (c) has a molecular weight in the range of ≥50 to ≤350 g/mol.

85. In another embodiment, the polyurethane as described hereinabove comprises:
(a) at least one polyol,
(b) at least one polyisocyanate, and
(c) at least one $C_6$ to $C_8$ alkylaryl diol,
wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{\sum_{x=1}^{k}[(m_{KV,AD}/M_{KV,AD})*M_{Iso}+m_{KV,AD}]\right\}/m_{total}$$

wherein, $m_{KV,AD}$ is the mass of the at least one $C_6$ to $C_8$ alkylaryl diol (c) in g, $M_{KV,AD}$ is the molar mass of the at least one $C_6$ to $C_8$ alkylaryl diol (c) in g/mol, $M_{Iso}$ is the molar mass of the at least one polyisocyanate (b) in g/mol, $m_{total}$ is the total mass of all the starting materials in g, k is the number of $C_6$ to $C_8$ alkylaryl diol (c), wherein the at least one $C_6$ to $C_8$ alkylaryl diol (c) has a molecular weight in the range of ≥50 to ≤350 g/mol.

86. In another embodiment, the polyurethane as described hereinabove comprises:
(a) at least one polyol,
(b) at least one polyisocyanate, and
(c) at least one $C_8$ alkylaryl diol,
wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{\sum_{x=1}^{k}[(m_{KV,AD}/M_{KV,AD})*M_{Iso}+m_{KV,AD}]\right\}/m_{total}$$

wherein, $m_{KV,AD}$ is the mass of the at least one $C_8$ alkylaryl diol (c) in g, $M_{KV,AD}$ is the molar mass of the at least one $C_8$ alkylaryl diol (c) in g/mol, $M_{Iso}$ is the molar mass of the at least one polyisocyanate (b) in g/mol, $m_{total}$ is the total mass of all the starting materials in g, k is the number of $C_8$ alkylaryl diol (c), wherein the at least one $C_8$ alkylaryl diol (c) has a molecular weight in the range of ≥50 to ≤350 g/mol.

87. In another embodiment, the polyurethane as described comprises:
(a) at least one polyol,
(b) at least one polyisocyanate, and
(c) 1,2-benzene dimethanol, wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{\sum_{x=1}^{k}[(m_{KV,AD}/M_{KV,AD})*M_{Iso}+m_{KV,AD}]\right\}/m_{total}$$

wherein,
$m_{KV,AD}$ is the mass of 1,2-benzene dimethanol (c) in g,
$M_{KV,AD}$ is the molar mass of 1,2-benzene dimethanol (c) in g/mol,
$M_{Iso}$ is the molar mass of the at least one polyisocyanate (b) in g/mol,
$m_{total}$ is the total mass of all the starting materials in g,
k is the number of 1,2-benzene dimethanol (c).

88. In another embodiment, the polyurethane as described hereinabove comprises:
(a) at least one polyol,
(b) at least one polyisocyanate, and
(c) 1,3-benzene dimethanol,
wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{\sum_{x=1}^{k}[(m_{KV,AD}/M_{KV,AD})*M_{Iso}+m_{KV,AD}]\right\}/m_{total}$$

wherein,
$m_{KV,AD}$ is the mass of 1,3-benzene dimethanol (c) in g,
$M_{KV,AD}$ is the molar mass of 1,3-benzene dimethanol (c) in g/mol,
$M_{Iso}$ is the molar mass of the at least one polyisocyanate (b) in g/mol,
$m_{total}$ is the total mass of all the starting materials in g,
k is the number of 1,3-benzene dimethanol (c).

89. In another embodiment, the polyurethane as described hereinabove comprises:
(a) at least one polyol,
(b) at least one polyisocyanate, and
(c) 1,4-benzene dimethanol,
wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{\sum_{x=1}^{k}[(m_{KV,AD}/M_{KV,AD})*M_{Iso}+m_{KV,AD}]\right\}/m_{total}$$

wherein,
$m_{KV,AD}$ is the mass of 1,4-benzene dimethanol (c) in g,
$M_{KV,AD}$ is the molar mass of 1,4-benzene dimethanol (c) in g/mol,
$M_{Iso}$ is the molar mass of the at least one polyisocyanate (b) in g/mol,
$m_{total}$ is the total mass of all the starting materials in g,
k is the number of 1,4-benzene dimethanol (c).

90. Accordingly, in an embodiment, the polyurethane as described hereinabove comprises:
(a) at least one polyol,
(b) at least one polyisocyanate, and
(c) at least one low molecular weight aromatic diol comprising at least one $C_6$ to $C_{14}$ aromatic diol (c1) and at least one secondary diol (c2),
wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{\sum_{x=1}^{k}[(m_{KV,AD}/M_{KV,AD})*M_{Iso}+m_{KV,AD}]\right\}/m_{total}$$

wherein,
$m_{KV,AD}$ is the mass of the at least one low molecular weight aromatic diol (c) in g,
$M_{KV,AD}$ is the molar mass of the at least one low molecular weight aromatic diol (c) in g/mol,
$M_{Iso}$ is the molar mass of the at least one polyisocyanate (b) in g/mol,
$M_{total}$ is the total mass of all the starting materials in g,
k is the number of low molecular weight aromatic diol (c).
wherein the at least one low molecular weight aromatic diol (c) has a molecular weight in the range of ≥50 to ≤350 g/mol.

91. In another embodiment, the polyurethane comprises:
(a) at least one polyol,
(b) at least one polyisocyanate, and
(c) at least one low molecular weight aromatic diol comprising at least one $C_6$ to $C_{14}$ aromatic diol (c1) and at least one aliphatic diol (c21),
wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{\sum_{x=1}^{k}[(m_{KV,AD}/M_{KV,AD})*M_{Iso}+m_{KV,AD}]\right\}/m_{total}$$

wherein,
$m_{KV,AD}$ is the mass of the at least one low molecular weight aromatic diol (c) in g,
$M_{KV,AD}$ is the molar mass of the at least one low molecular weight aromatic diol (c) in g/mol, $M_{Iso}$ is the molar mass of the at least one polyisocyanate (b) in g/mol, $m_{total}$ is the total mass of all the starting materials in g, k is the number of low molecular weight aromatic diol (c).

wherein the at least one low molecular weight aromatic diol (c) has a molecular weight in the range of ≥50 to ≤350 g/mol.

92. In another embodiment, the polyurethane comprises:
(a) at least one polyol,
(b) at least one polyisocyanate, and
(c) at least one low molecular weight aromatic diol comprising at least one C6 to C14 aromatic diol (c1) and at least one aromatic diol (c22),
wherein the polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein, $m_{KV,AD}$ is the mass of the at least one low molecular weight aromatic diol (c) in g, $M_{KV,AD}$ is the molar mass of the at least one low molecular weight aromatic diol (c) in g/mol, $M_{Iso}$ is the molar mass of the at least one polyisocyanate (b) in g/mol, $m_{total}$ is the total mass of all the starting materials in g, k is the number of low molecular weight aromatic diol (c).

wherein the at least one low molecular weight aromatic diol (c) has a molecular weight in the range of ≥50 to ≤350 g/mol.

93. In another aspect of the present invention, a two-shot process for preparing a polyurethane, as described hereinabove, comprises the steps of:
(A) preparing a pre-polymer comprising at least one polyol (a) and at least one polyisocyanate (b),
(B) heating the pre-polymer of step (A) to a temperature in the range of ≥20° C. to ≤100° C. for a period in the range of ≥0.1 h to ≤20 h,
(C) heating the at least one low molecular weight aromatic diol (c) to a temperature in the range of ≥100° C. to ≤140° C. to obtain a melted diol,
(D) mixing the pre-polymer of step (B) with the melted diol of step (C) at a temperature in the range of ≥110° C. to ≤150° C., optionally in the presence of at least one catalyst (e) and/or at least one additive (d), to obtain a polyurethane having the hard segment fraction in the range of ≥0.10 to ≤0.90 and Tg in the range of ≥−40° C. to ≤80° C. determined by differential scanning calorimetry according to DIN EN ISO 11357-1 at the heating rate of 20 K/min the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein, $m_{KV,AD}$ is the mass of the at least one low molecular weight aromatic diol (c) in g, $M_{KV,AD}$ is the molar mass of the at least one low molecular weight aromatic diol (c) in g/mol, $M_{Iso}$ is the molar mass of the at least one polyisocyanate (b) in g/mol, $m_{total}$ is the total mass of all the starting materials in g, k is the number of low molecular weight aromatic diol (c), wherein the at least one low molecular weight aromatic diol (c) has a molecular weight in the range of ≥50 to ≤350 g/mol.

94. A one-shot process for preparing a polyurethane, as described hereinabove, comprising the steps of:
A') providing at least one polyol (a),
B') providing at least one polyisocyanate (b) and at least one low molecular weight aromatic diol (c),
C') reacting the at least one polyol (a) of step (A') with step (B') optionally in the presence of at least one catalyst (e) and/or with at least one additive (d) to obtain a polyurethane having a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein, $m_{KV,AD}$ is the mass of the at least one low molecular weight aromatic diol (c) in g, $M_{KV,AD}$ is the molar mass of the at least one low molecular weight aromatic diol (c) in g/mol, $M_{Iso}$ is the molar mass of the at least one polyisocyanate (b) in g/mol, $m_{total}$ is the total mass of all the starting materials in g, k is the number of low molecular weight aromatic diol (c), wherein the at least one low molecular weight aromatic diol (c) has a molecular weight in the range of ≥50 to ≤350 g/mol.

95. In an embodiment, the polyurethane as described hereinabove, is a thermoplastic polyurethane comprising:
(a) at least one polyol,
(b) at least one polyisocyanate, and
(c) at least one low molecular weight aromatic diol,
wherein the thermoplastic polyurethane has a hard segment fraction in the range of ≥0.10 to ≤0.90 and a Tg in the range of ≥−40° C. to ≤80° C. determined by differential scanning calorimetry ac-cording to DIN EN ISO 11357-1 at a heating rate of 20 K/min, the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein, $m_{KV,AD}$ is the mass of the at least one low molecular weight aromatic diol (c) in g, $M_{KV,AD}$ is the molar mass of the at least one low molecular weight aromatic diol (c) in g/mol, $M_{Iso}$ is the molar mass of the at least one polyisocyanate (b) in g/mol, $m_{total}$ is the total mass of all the starting materials in g, k is the number of low molecular weight aromatic diol (c), wherein the at least one low molecular weight aromatic diol (c) has a molecular weight in the range of ≥50 to ≤350 g/mol.

96. Accordingly, the one-shot process for preparing the thermoplastic polyurethane, as described hereinabove, comprises the steps of:

A') providing at least one polyol (a),

B') providing at least one polyisocyanate (b) and at least one low molecular weight aromatic diol (c), C') reacting the at least one polyol (a) of step (A') with step (B') optionally in the presence of at least one catalyst (e) and/or with at least one additive (d) to obtain a thermoplastic polyurethane having a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein, $m_{KV,AD}$ is the mass of the at least one low molecular weight aromatic diol (c) in g, $M_{KV,AD}$ is the molar mass of the at least one low molecular weight aromatic diol (c) in g/mol, $M_{Iso}$ is the molar mass of the at least one polyisocyanate (b) in g/mol, $m_{total}$ is the total mass of all the starting materials in g, k is the number of low molecular weight aromatic diol (c), wherein the at least one low molecular weight aromatic diol (c) has a molecular weight in the range of ≥50 to ≤350 g/mol.

97. In another embodiment, the polyurethane as described hereinabove, is a cast polyurethane comprising:

(a) at least one polyol, (b) at least one polyisocyanate, and (c) at least one low molecular weight aromatic diol, wherein the cast polyurethane has a hard segment fraction in the range of ≥0.10 to ≤0.90 and a Tg in the range of ≥−40° C. to ≤80° C. determined by differential scanning calorimetry according to DIN EN ISO 11357-1 at a heating rate of 20 K/min, the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein, $m_{KV,AD}$ is the mass of the at least one low molecular weight aromatic diol (c) in g, $M_{KV,AD}$ is the molar mass of the at least one low molecular weight aromatic diol (c) in g/mol, $M_{Iso}$ is the molar mass of the at least one polyisocyanate (b) in g/mol, $m_{total}$ is the total mass of all the starting materials in g, k is the number of low molecular weight aromatic diol (c), wherein the at least one low molecular weight aromatic diol (c) has a molecular weight in the range of ≥50 to ≤350 g/mol.

98. Accordingly, in an embodiment, the two-shot process for preparing the cast polyurethane, as described hereinabove, comprises the steps of:

(A) preparing a pre-polymer comprising at least one polyol (a) and at least one polyisocyanate (b), (B) heating the pre-polymer of step (A) to a temperature in the range of ≥20° C. to ≤100° C. for a period in the range of ≥0.1 h to ≤20 h, (C) heating the at least one low molecular weight aromatic diol (c) to a temperature in the range of ≥100° C. to ≤140° C. to obtain a melted diol, (D) mixing the pre-polymer of step (B) with the melted diol of step (C) at a temperature in the range of ≥110° C. to ≤150° C., optionally in the presence of at least one catalyst (e) and/or at least one additive (d), to obtain a cast polyurethane having the hard segment fraction in the range of ≥0.10 to ≤0.90 and Tg in the range of ≥−40° C. to ≤80° C. determined by differential scanning calorimetry according to DIN EN ISO 11357-1 at the heating rate of 20 K/min the hard segment fraction being defined by the formula:

Hard segment fraction =

$$\left\{ \sum_{x=1}^{k} [(m_{KV,AD} / M_{KV,AD}) * M_{Iso} + m_{KV,AD}] \right\} / m_{total}$$

wherein, $m_{KV,AD}$ is the mass of the at least one low molecular weight aromatic diol (c) in g, $M_{KV,AD}$ is the molar mass of the at least one low molecular weight aromatic diol (c) in g/mol, $M_{Iso}$ is the molar mass of the at least one polyisocyanate (b) in g/mol, $m_{total}$ is the total mass of all the starting materials in g, k is the number of low molecular weight aromatic diol (c), wherein the at least one low molecular weight aromatic diol (c) has a molecular weight in the range of ≥50 to ≤250 g/mol.

Examples will be used below to illustrate the invention.

EXAMPLES AND COMPARATIVE EXAMPLES

1. Compounds Used

| | |
|---|---|
| $C_4$ to $C_{12}$ aliphatic dicarboxylic acid | Adipic acid |
| $C_{10}$ to $C_{14}$ aromatic diol | 1,5-dihydroxynaphthalene |

-continued

| | |
|---|---|
| $C_2$ to $C_4$ alkylene oxide | propylene oxide |
| | butylene oxide |
| $C_2$ to $C_{10}$ diol/low molecular weight polyfunctional compound reactive towards isocyanate | 1,4-butanediol(BDO) molecular weight: 90.12 g/mol |
| $C_6$ to $C_{14}$ alkylaryl diol | 1,4-benzendimethanol (BDM) molecular weight: 138.16 g/mol |
| KOH | |
| Tin tetrabutoxid | |
| Tin octoate | |
| Titanium(IV) butoxide (CAS: 5593-70-4 (TTB)) | |
| Tin(II) 2-ethylhexanoate (CAS: 301-10-0 (SDO)) | |
| are available from Sigma Aldrich | |
| Secondary polyol | Lupraphen ® 6607/1 (polyester polyol) |
| Isocyanate | Lupranat ® M20 (polymeric MDI) |
| Polyether based TPU | Elastollan ® 1195A |
| Polyisocyanate | Lupranat ® MET (4,4'-MDI) |
| Polyester based polyol | Elastollan ® PESOL (adipate ester) |
| Tetra hydrofuran | PolyTHF ® 1000, PolyTHF ®2000 |
| Additive | Elastostab ® H01 (hydrolysis stabilizer) |
| are available from BASF | |

2. Standard Methods

| | |
|---|---|
| Weight average molecular weight | DIN 55672-1 |
| Viscosity (at 25° C.) | DIN EN ISO 3219 |
| $T_g$ | DIN EN ISO 11357-1 at 20 K/min |
| OH value | DIN 53240 |
| Shore hardness | ASTM D2240 |
| Tensile strength | DIN 53504 |
| Elongation at break | DIN 53504 |
| Compression set | ASTM D395 |
| Creep resistance | DIN EN ISO 899-1 |

3. Synthesis of alkoxylated dihydroxynaphthalene 3.1 Example 1

1,5-dihydroxynaphthalene propoxylate

A 300 mL pressure reactor provided with stirrer, jacket heating and cooling, metering facility for alkylene oxide was made inert in nitrogen atmosphere and heated to 140° C. A mixture comprising 32 g of 1,5-dihydroxynaphthalene and 1.20 g of KOH (50 wt. % aqueous solution) was added to the reactor and kept at 140° C. 168 g of propylene oxide was added to the mixture over a period of 3 h and 8 min to obtain a reaction mixture. The reaction mixture was allowed to react for 3 h at 140° C., followed by stripping with nitrogen for 20 min and then cooling down to 40° C. Workup done with macrosorb. 181 g of 1,5-dihydroxynaphthalene propoxylate as a brownish oil having an OH number of 156 mg KOH/g and a viscosity of 699 mPa·s at 25° C. was obtained.

3.2 Example 2

1,5-dihydroxynaphthalene ethoxylate

A 300 mL pressure reactor provided with stirrer, jacket heating and cooling, metering facility for alkylene oxide was made inert in nitrogen atmosphere and heated to 140° C. A mixture comprising 62.55 g of 1,5-dihydroxynaphthalene, 50 g of toluene and 1.20 g of KOH (50 wt. % aqueous solution) was added to the reactor and kept at 140° C. 136.9 g of ethylene oxide was added to the mixture over a period of 5 h and 20 min to obtain a reaction mixture. The reaction mixture was allowed to react for 2 h at 140° C., followed by stripping with nitrogen for 20 min and then cooling down to 40° C. The unreacted toluene was removed on rotavap and workup was done with macrosorb. 189 g of 1,5-dihydroxynaphthalene ethoxylate as a brownish oil having an OH number of 241 mg KOH/g and a viscosity of 2310 mPa·s at 25° C. was obtained.

4. Synthesis of polyester polyol (PESOL)

4.1 PESOL 2

In a 4 L round-bottom flask, a mixture comprising 1138 g adipic acid, 607.73 g of 1,4-butanediol, 611 g of 1,5-dihydroxynaphthalene propoxylate (from example 1), 1 ppm tin tetrabutoxid and 5 ppm of tin octoate were added. The mixture was heated to 200° C. for 3 h with stirring and left for 25 h. Water formed during the reaction was continuously removed by distillation. PESOL 2 as a brownish oil having an OH number of 54 mg KOH/g, acid number of 0.8 mg KOH/g and viscosity of 707 mPa·s at 25° C. was obtained.

4.2 PESOL 1

In a 4 L round-bottom flask, a mixture comprising 1037 g adipic acid, 607.73 g of 1,4-butanediol, 611 g of 1,5-dihydroxynaphthalene ethoxylate (from example 2), 1 ppm tin tetrabutoxid and 5 ppm of tin octoate were added. The mixture was heated to 220° C. for 3 h with stirring and left for 20 h. Water formed during the reaction was continuously removed by distillation. PESOL 1 as a yellowish oil having an OH number of 53 mg KOH/g, acid number of 1.8 mg KOH/g and viscosity of 1250 mPa·s at 25° C. was obtained.

5. General description of thermoplastic polyurethane synthesis 5.1 TPU 1 (Comparative)

In a 2 L metal container, 800 g of Lupraphen® 6607/1 and 164.59 g of 1,4-butanediol was mixed with a mechanical stirrer under a constant flow of nitrogen. The container was then subsequently covered and placed inside a hot air oven preheated at 100° C. The preheated mixture was taken out of the oven and 6.4 g of Elastostab® H01 was added followed by stirring. In a separate vessel, Lupranat® M20 was heated to a temperature of 45° C. Once the temperature of the mixture reached 80° C., 560 g of preheated Lupranat® was added and the mixture stirred at 200 rpm. Due to the exothermic reaction, the mixture was poured into a teflon frame kept over a hot plate having a temperature of 125° C. to obtain a TPU slab. Once the TPU slab turned solid, it was removed from the hot plate and subsequently annealed inside a hot oven at 80° C. for 24 h. The TPU was allowed to cool gradually, followed by milling in a miller and thereafter shredded to small granulates. The granulates were dried at 110° C. for 3 h and then injection molded to test plaques of size 2mm×6mm. The test plaques were then used to determine the mechanical performance as provided in Table 2.

5.2 Further Examples were Conducted with the Above Process Conditions, Except that the Present Invention polyester polyol was now Used

TABLE 1

TPU compositions

| TPU | Polyester polyol | Secondary polyol | Polyester polyol:secondary polyol | Hard segment fraction [%] | $T_g$ (° C.) |
|---|---|---|---|---|---|
| TPU 1 (comparative) | Lupraphen ® 6607/1 | — | — | 40.89 | −20 |
| TPU 2 | PESOL 1 | Lupraphen ® 6607/1 | 10:90 | 40.89 | −15 |
| TPU 3 | PESOL 1 | Lupraphen ® 6607/1 | 20:80 | 40.89 | −15 |
| TPU 4 | PESOL 2 | Lupraphen ® 6607/1 | 10:90 | 40.89 | −15 |
| TPU 5 | PESOL 2 | Lupraphen ® 6607/1 | 20:80 | 40.89 | −15 |

The above TPUs were checked for their mechanical performance and the results provided hereinbelow in Table 2.

TABLE 2

Mechanical performance of different TPUs

| TPU | Shore hardness [Shore D] | Tensile strength [MPa] | | | Elongation at break | | | Compression set [%] | |
|---|---|---|---|---|---|---|---|---|---|
| | | 25° C. | 80° C. | Δ [%] | 25° C. | 80° C. | Δ [%] | 72 h/23° C./ 30 min | 24 h/70° C./ 30 min |
| TPU 1 (comparative) | 51 | 56 | 44 | −21 | 530 | 910 | 72 | 22 | 35 |
| TPU 2 | 51 | 49 | 44 | −10 | 520 | 1190 | 129 | 22 | 33 |
| TPU 3 | 50 | 50 | 48 | −4 | 470 | 1070 | 128 | 18 | 35 |
| TPU 4 | 51 | 49 | 43 | −12 | 490 | 1040 | 112 | 20 | 35 |
| TPU 5 | 51 | 49 | 41 | −16 | 490 | 1070 | 118 | 25 | 41 |

As evident from table 2, the polyester polyol of the present invention imparts the TPU with improved tensile strength and elongation at break. The TPUs incorporating different amounts of alkoxylated dihydroxynaphthalene based PESOL resulted in less than 20% decrease in the tensile strength values and more than 100% increase in the elongation at break when measured at elevated temperature i.e. 80° C. In fact, the 4% decrease in the tensile strength for TPU 3 confirms that the present invention TPU can withstand high loads without undergoing much deformation. Moreover, the compression set values of the present invention TPUs do not vary much in comparison to TPU 1 (comparative). These improvements may be attributed to the incorporation of the naphthalene motif i.e. alkoxylated dihydroxynaphthalene as a backbone in the soft segment of the TPU, which provide the additional π-π stacking and strengthen their performance.

On the contrary, TPU 1 (comparative) showed more than 20% decrease in the tensile strength and 72% increase in the elongation at break at elevated temperature, thereby confirming comparably inferior performance characteristics in view of the present invention TPUs.

Thermal resistance of the TPUs were also checked and compared with commercially available TPU. To do so, the temperature was kept at 165° C. for 2500 h (see Table 3).

TABLE 3

Thermal resistance performance of different TPUs

| TPU | Temperature [° C.] | Elongation at break | |
|---|---|---|---|
| | | Before ageing | After ageing |
| TPU 1 (comparative) | 165 | 740 | <50% |
| Elastollan ® 1195A | 165 | 500 | Melted |
| TPU 3 | 165 | 470 | >50% |
| TPU 5 | 165 | 460 | >50% |

For auto cable operations, it is desired that the elongation at break after ageing should be >50%. Neither the polyester based (TPU 1) nor the polyether based (Elastollan® 1195A)

TPU can achieve the desired elongation at break. Thus, the present invention TPUs show better thermal resistance performance than the other available TPUs.

TABLE 3

Creep resistance performance of different TPUs

| TPU | Delta $L_z$ value |
| --- | --- |
| TPU 1 (comparative) | 8.2 |
| Elastollan ® 1195A | 11.8 |
| TPU 3 | 5.3 |
| TPU 5 | 5.6 |

The Delta $L_z$ values represent the difference in elongation in length values. Since the creep performance illustrates the deformation of the TPU, a small value of Delta Lz represents better resistance to creep. Therefore, as evident in table 3, the present invention TPUs have substantially better creep resistance in comparison to the other available polyester (TPU 1) and polyether (Elastollan® 1195A) based TPUs.

6. Synthesis of polyester polyol (PESOL)

In a 4 L round-bottom flask, a mixture comprising 1613.3 g adipic acid, 775.2 g of 1,4-butanediol, 509 g of 1,4-benzenedimethanol, 1 ppm titanium(IV) tetrabutoxid and 5 ppm of Tin(II) 2-ethylhexanoate were added. The mixture was heated to 200° C. for 3 h with stirring. The reaction temperature was increased 240° C. and left for 25 h. Water formed during the reaction was continuously removed by distillation. A vacuum pressure of 60mbar was applied to drive the reaction complete. PESOL as a brownish oil having an OH number of 55 mg KOH/g, acid number of 1.09 mg KOH/g and viscosity of 1138 mPa·s at 75° C. was obtained.

7. One-Shot Process for thermoplastic polyurethane synthesis

In a 2 L metal container, polyol and chain extender were mixed with a mechanical stirrer under a constant flow of nitrogen. The container was then subsequently covered and placed inside a hot air oven preheated at 100° C. to 120° C. The preheated mixture was taken out of the oven and 6.4 g of Elastostab® H01 was added followed by stirring. In a separate vessel, polyisocyanate was heated to a temperature of 45° C. Once the temperature of the mixture reached 80° C., preheated polyisocyanate was added and the mixture stirred at 200 rpm. Due to the exothermic reaction, the mixture was poured into a teflon frame kept over a hot plate having a temperature of 125° C. to obtain a TPU slab. Once the TPU slab turned solid, it was removed from the hot plate and subsequently annealed inside a hot oven at 80° C. for 24 h. The TPU was allowed to cool gradually, followed by milling in a miller and thereafter shredded to small granulates. The granulates were dried at 110° C. for 3 h and then injection molded to test plaques of size 2mm×6mm. The test plaques were then used to determine the mechanical performance as provided in Table 6.

Further examples, both comparative and inventive, were conducted with the above process conditions having the below mentioned composition.

TABLE 4

TPU compositions for one-shot process

| TPU | Polyol | Chain extender | Polyisocyanate | Hard segment fraction | $T_g$ (° C.) |
| --- | --- | --- | --- | --- | --- |
| TPU 1a | 750 g PolyTHF ® 1000 | 182 g BDM | 529.25 g Lupranat ® MET | 0.35 | −30 |
| CE 1a | 700 g PolyTHF ® 1000 | 169.36 g BDO | 648.55 g Lupranat ® MET | 0.35 | −40 |
| TPU 2a | 1000 g Elastollan ® PESOL | 163.3 g BDM | 426.2 g Lupranat ® MET | 0.29 | −20 |
| CE 2a | 1000 g Elastollan ® PESOL | 121.53 g BDO | 470 g Lupranat ® MET | 0.29 | −30 |
| TPU 3a | 200 g PESOL + 800 g Elastollan ® PESOL | 163.2 g BDM | 425.47 g Lupranat ® MET | 0.29 | −10 |
| CE 3a | 200 g PESOL + 800 g Elastollan ® PESOL | 121.47 g BDO | 467.2 g Lupranat ® MET | 0.29 | −15 |

8. Two-Shot or pre-polymer Process for Cast polyurethane synthesis

Polyol was mixed with polyisocyanate at a temperature of 50° C. to obtain a polymeric mixture. The polymeric mixture was heated to 80° C. and stirred under nitrogen at this temperature for 2 h. The reaction temperature was monitored by a thermo element PT100. The resulting pre-polymer was cooled to room temperature.

The chain extender was now melted to 120° C. The above pre-polymer was heated to 80° C. for 2 h and then mixed with the melted chain extender at a temperature of 130° C. Subsequent casting into a mold with a temperature of 125° C. lead to the resulting samples. After annealing at 125° C. and further annealing at 110° C. for 16 h yielded the final test plaques. The test plaques were then used to determine the mechanical performance as provided in Table 6.

Comparative samples were obtained in a similar manner as above, except that while mixing the melted chain extender with the pre-polymer there was no further heating provided. The composition of CPU samples, both inventive and comparative, are mentioned hereinbelow:

TABLE 5

CPU compositions for two-shot or pre-polymer process

| | Pre-polymer | | | |
|---|---|---|---|---|
| CPU | Polyol | Polyisocyanate | NCO [%] | Chain extender |
| CPU 1a | 658 g PolyTHF ® 1000 | 342 g Lupranat ® MET | 5.88 | 117 g BDM |
| CPU 2a | 697 g PolyTHF ® 2000 | 303 g Lupranat ® MET | 7.30 | 117 g BDM |
| CE 4a | 573 g PolyTHF ® 1000 | 427 g Lupranat ® MET | 9.43 | 117 g BDO |

The TPUs obtained from the one-shot process and the CPUs obtained from the two-shot process were checked for their mechanical performance and the results provided hereinbelow in Table 6.

TABLE 6

Mechanical performance of different polyurethanes

| Polyurethane | Shore hardness [Shore A] | Compression set [%] | | |
|---|---|---|---|---|
| | | 72 h/23° C./ 30 min | 24h/70° C./ 30 min | 24 h/100° C./ 30 min |
| CE 1a | 98 | 26 | 46 | 76 |
| TPU 1a | 98 | 18 | 32 | 46 |
| CE 2a | 85 | 23 | 36 | 50 |
| TPU 2a | 85 | 18 | 24 | 33 |
| TPU 3a | 85 | 24 | 34 | 36 |
| CE 3a | 85 | 24 | 35 | 52 |
| CE 4a | 94 | 25 | 41 | 45 |
| CPU 1a | 96 | 18 | 21 | 27 |
| CPU 2a | 93 | 11 | 16 | 24 |

The importance of the low molecular weight aromatic diol (BDM), as a chain extender as well as in the polyol, is evident from Table 3. The presence of BDM as a chain extender in the inventive examples resulted in a substantial decrease in the compression set values over a wide range of temperature. In fact, the compression set value (at 100° C.) in case of CPU 2a dropped to ~46% in comparison to CE 3a. Such a material is very desirable for application in areas operating under a wide range of temperature such as automotive application, manufacturing industry, etc. The the polyurethane materials of the present invention overcome the need of replacing the TPUs or CPUs every time the temperature shoots up, thereby resulting in cost saving.

CE 3a although makes use of BDM as a diol in the PESOL, the chain extender used therein is BDO. The presence of BDM as a chain extender is important as it provides the required π-π stacking which is inherent of the aromatic backbone. In the absence of the said aromatic backbone by means of the present invention chain extender (i.e. BDM), the final TPU obtained did not report any change in the compression set value which implies that the deformation in the said TPU remains the same (compare CE 2 and CE 3) over the wide range of temperature.

LITERATURE CITED

AU 2011335151
U.S. Pat. No. 5,574,092
Der-Jang Liaw, Die Angewandte Makromolekular Chemie. 1997, 245, 89-104

The invention claimed is:

1. A polyisocyanate polyaddition product, obtained by a process comprising:
reacting at least a polyisocyanate composition (C-I) comprising polyisocyanate and a composition (C-II) comprising a compound (C-A) having at least two hydroxyl groups which are reactive towards isocyanate groups, wherein the compound (C-A) has a molecular weight of 500 g/mol or more and comprises polycyclic aromatic moieties thereby producing a first product, and
reacting the first product with a compound (C-C) having at least two functional groups which are reactive towards isocyanate groups as a chain extender, wherein the compound (C-C) has a molecular weight ranging from 49 g/mol to 499 g/mol,
wherein compound (C-A) is a polyester polyol and the polycyclic aromatic moieties of the compound (C-A) comprise at least one polyol selected from the group consisting of alkoxylated 1,4-dihydroxynaphthalene, alkoxylated 1,5-dihydroxynaphthalene, and alkoxylated 1,8-dihydroxynaphthalene,
the polyisocyanate is an aromatic polyisocyanate,
the polyisocyanate polyaddition product is a thermoplastic polyurethane; and
the polyester polyol as compound (C-A) has a content of from 10 to 40 wt % of at least one of the polyols, with respect to the total weight of polyester polyol as compound (C-A).

2. The polyisocyanate polyaddition product according to claim 1, wherein the compound (C-C) comprises aromatic moieties.

3. The polyisocyanate polyaddition product according to claim 1, wherein the compound (C-C) is 1,4-benzenedimethanol.

4. The polyisocyanate polyaddition product according to claim 1, having incorporated in the polyester polyol at least one alkoxylated naphthalene diol in the range of ≥10 wt.-% to ≤40 wt.-% based on the total weight of the polyester polyol.

5. An article, comprising the polyisocyanate polyaddition product according to claim 1.

6. The article according to claim 5, wherein the article is a cable, a conveyor belt, a roller, a seal for a gasket or a railway pad.

7. The polyisocyanate polyaddition product according to claim 1, wherein the polyester polyol as compound (C-A) comprises at least one of the polyols in polymerized form.

8. The polyisocyanate polyaddition product according to claim 1, wherein the polyester polyol as compound (C-A) comprises at least one alkoxylated 1,5-dihydroxynaphthalene in polymerized form.

9. The polyisocyanate polyaddition product according to claim 1, wherein composition (C-II) further comprises at least one secondary polyol different from the polyester polyol of compound (C-A), and wherein a weight ratio of the polyester polyol to the at least one secondary polyol is 5:95 to 75:25.

10. The polyisocyanate polyaddition product according to claim 1, wherein the at least one polyol is the alkoxylated 1,5-dihydroxynaphthalene.

11. The polyisocyanate polyaddition product according to claim 10, wherein composition (C-II) further comprises at least one secondary polyol different from the polyester polyol of compound (C-A), wherein the weight ratio of the compound (C-A) to the at least one secondary polyol is from 10:90 to 20:80.

12. A method for producing an article, the method comprising:

forming the polyisocyanate polyaddition product according to claim 1 into a cable, a conveyor belt, a roller, a seal for a gasket or a railway pad, as the article.

13. A process for preparing a polyisocyanate polyaddition product, the process comprising:

reacting at least a polyisocyanate composition (C-I) comprising polyisocyanate and a composition (C-II) comprising a compound (C-A) having at least two hydroxyl groups which are reactive towards isocyanate groups, wherein the compound (C-A) has a molecular weight of 500 g/mol or more and comprises polycyclic aromatic moieties, thereby producing a first product, and reacting the first product with a compound (C-C) having at least two functional groups which are reactive towards isocyanate groups as a chain extender, wherein the compound (C-C) has a molecular weight ranging from 49 g/mol to 499 g/mol, wherein compound (C-A) is a polyester polyol and the polycyclic aromatic moieties of the compound (C-A) comprise at least one polyol selected from the group consisting of alkoxylated 1,4-dihydroxynaphthalene, alkoxylated 1,5-dihydroxynaphthalene, and alkoxylated 1,8-dihydroxynaphthalene, the polyisocyanate is an aromatic polyisocyanate, and the polyisocyanate polyaddition product is a thermoplastic polyurethane; and the polyester polyol as compound (C-A) has a content of from 10 to 40 wt % of at least one of the polyols, with respect to the total weight of polyester polyol as compound (C-A).

14. A polyisocyanate polyaddition product, obtained by a process comprising:

reacting at least a polyisocyanate composition (C-I) comprising an aromatic polyisocyanate and a composition (C-II) comprising a compound (C-A) having at least two hydroxyl groups which are reactive towards isocyanate groups, wherein the compound (C-A) has a molecular weight of 500 g/mol or more and comprises polycyclic aromatic moieties thereby producing a first product, and reacting the first product with a compound (C-C) having at least two functional groups which are reactive towards isocyanate groups as a chain extender, wherein the compound (C-C) has a molecular weight ranging from 49 g/mol to 499 g/mol, wherein compound (C-A) is a polyester polyol and the polycyclic aromatic moieties of the compound (C-A) comprise alkoxylated 1,5-dihydroxynaphthalene, wherein the polyisocyanate polyaddition product is a thermoplastic polyurethane, composition (C-II) further comprises at least one secondary polyol different from the polyester polyol of compound (C-A), wherein the weight ratio of the compound (C-A) to the at least one secondary polyol is from 10:90 to 20:80, and the at least one secondary polyol is a polyester polyol different from the compound (C-A).

* * * * *